United States Patent [19]

Hanna

[11] 4,441,204
[45] Apr. 3, 1984

[54] APPARATUS FOR RECOGNITION OF STYLIZED CHARACTERS

[75] Inventor: Charas Hanna, Belfort, France

[73] Assignee: Compagnie Internationale pour l'Informatique Cii-Honeywell Bull (Societe Anonyme), Paris, France

[21] Appl. No.: 326,702

[22] Filed: Dec. 2, 1981

[30] Foreign Application Priority Data

Dec. 15, 1980 [FR] France ............................... 80 26568

[51] Int. Cl.³ ............................................. G06K 9/00
[52] U.S. Cl. ...................................................... 382/7
[58] Field of Search .................. 382/7, 27, 29, 33, 64, 382/37, 57; 235/449, 493, 494

[56] References Cited

U.S. PATENT DOCUMENTS

| | | | |
|---|---|---|---|
| 3,111,645 | 11/1963 | Milford | 382/35 |
| 3,212,058 | 10/1965 | Sanner | 382/64 |
| 3,267,439 | 8/1966 | Bonner | 382/37 |
| 3,297,951 | 1/1967 | Blasbalg | 382/35 |
| 3,638,238 | 1/1972 | Milford et al. | 235/494 |
| 3,644,889 | 2/1972 | Skenderoff et al. | 382/35 |
| 3,688,267 | 8/1972 | Iijima et al. | 382/36 |

FOREIGN PATENT DOCUMENTS 1248226 10/1960 France .

OTHER PUBLICATIONS

Proceedings-Fall Joint Computer Conference, 1965, "Assocative Pattern Processing", pp. 112–116.

Primary Examiner—John C. Martin
Assistant Examiner—Michael D. Parker
Attorney, Agent, or Firm—Kerkan, Stowell, Kondracki & Clarke

[57] ABSTRACT

Character recognition apparatus for the recognition of stylized E13B characters are provided wherein the siganls resulting from the reading of a character by a reading head 17 are sampled to be treated by two different asemblies (EB1 and EB2) of operator-generator blocks of logic signals. The discrimination of the signals delivered by each of these assemblies is realized, in a respective one of the two assemblies (RK1 and RK2) by identification elements (EK1, EK2, ..., EK14) under the control of two groups of validation circuits (CV1 and CV2). These identification elements (EK1, EK2, . . . , EK14) are each associated with a respective one of the characters of a group.

13 Claims, 28 Drawing Figures 7 6 5 4 3 2 1

7 6 5 4 3 2 1

7 6 5 4 3 2 1

7 6 5 4 3 2 1

APPARATUS FOR RECOGNITION OF STYLIZED CHARACTERS

BACKGROUND OF THE INVENTION

1. Field of the Invention

The present invention relates to apparatus for the recognition of stylized characters formed on a document, and has particular application in apparatus for processing information at high speed.

2. Description of the Prior Art

When processing documents used in commercial transactions, inventory control and general business operations, reliance is made to a great extent on documents such as checks, bills of sale, receipts, invoices, tags or other documents containing information in the form of stylized characters. That is to say, characters of the human language which are conformed in such a way as to be easily identified by associated character recognition apparatus capable of generating sequences of electric signals specific to the form of the characters. These stylized characters can be constituted, for example, by well known symbols which have been established in accordance with the requirement of the American Association of Banks and which are now currently designated under the name of characters E13B.

To identify these stylized characters, utilization may be made of character recognition apparatus of the type described in French patent No. 1,248,226 in which a variable voltage signal generated during the passage of a stylized character before a transducing reading head is divided into a certain number of partial signals, the partial signals are then simultaneously applied to several correlation rings, each of which is associated with a respective one of the characters to be identified. A correlation ring associated with the character to be read delivers an output voltage which is greater than the output voltages of the other correlation rings. By comparison of the voltages delivered by the different correlation rings, it is then possible to identify the character read.

Such character recognition apparatus, however, has certain disadvantages. For example, it is not always possible to identify the character read accurately because of the fact that the documents which carry the stylized characters are not always themselves perfect, and have defects such as surface irregularities or undesirable particles may be encrusted in the document during its manufacture or handling. Ink marks can be formed involuntarily on the document during printing of the characters. Defaults can also occur during printing and cause incompletely formed characters. All of these defects cause, in general, an alteration of form of the wave generated by the transducing head during the reading of a character, so that output voltages having practically the same maximum value may appear simultaneously at the outputs of two or several correlation rings. These multiple maximum voltages are then interpreted as an error and lead to the rejection of the document.

To compensate for these disadvantages, character recognition apparatus has been proposed as described and shown in French Patent No. 1,483,115. In this patent, the method of character recognition is based on the determination of the total energy content of signals corresponding to each form of wave, the determination of the energy content of these signals in the regions of precise frequency and the comparison of the energy content of these signals. Since, in this apparatus, a comparison is made between the energy at different frequencies and the total energy contained in the character, and comparisons are thus based on relative values and not absolute values, this method of recognition is not affected by parasites. However, in such apparatus, the number of precise frequency regions which serve for the comparison, as well as their size, is difficult to determine with accuracy. This determination is obtained, most often, only at the end of multiple trials undertaken during the adjustment of this apparatus. Thus, while the structure of each of the elements making up this apparatus is relatively simple, the realization of such apparatus is extensive, delicate and particularly costly.

Another form of character recognition is described and shown in French Patent No. 1,420,769. In this patent, each stylized character is considered to be constituted of a succession of portions of a character resulting from the cutting of this character into several parallel bands along a direction perpendicular to the direction of exploration of the reading head. The signal engendered during reading of this character is formed of a sequence of analogous elementary signals corresponding each to a respective one of the portions of this character. The recognition apparatus which is described in this patent comprises a generator of correlation signals, multiplying apparatus in which each elementary signal is multiplied by a correlation signal engendered by this generator, integrating apparatus which integrates the product delivered by this multiplying apparatus, classification apparatus which, in response to each integral received, delivers one of three values +1, −1 or 0, in accordance with the slope of the elementary signal corresponding to this integral, and an identification block which further comprises logic blocks based on types of characters to be read and which receive from the classification apparatus groups of values +1, −1 or 0 engendered consecutively by the reading of a character and furnish an identification signal at the output of the logic block which is associated with this character. Such recognition apparatus suffers from the disadvantage of requiring a large number of analogous circuits since the method of recognition rests on the determination of the slope of the various elementary signals resulting from the reading of a character. Further, this recognition apparatus requires a number of control elements and command elements both for assuring the indispensable synchronization between the different elementary signals and the correlation signals as well as for effecting the classification of the diverse integrals furnished by the integrating apparatus. Finally, this recognition apparatus is not protected from disturbances which are consecutively produced by an excess ink or a defect of inking and which effecting the form of the wave created by the reading head and more particularly the slope of the various elementary signals picking up this form of wave, result almost always in a rejection of the document.

SUMMARY OF THE INVENTION

The present invention overcomes or at least minimizes the disadvantages of prior art apparatus and provides a character recognition apparatus for stylized characters which is particularly simple, less costly and has the advantage of being practically insensible to the disturbances created by reason of the presence of undesirable traces of ink or a defect of inking in the design of the characters.

More precisely, the present invention relates to an improved apparatus for the recognition of stylized characters formed on a document. This apparatus comprises a reading station for the exploration of the characters and driving means to cause displacement between the document and the reading station in a direction of displacement allowing each character to be read and recognized by movement before the reading station. This station is established so that each time a character passes before it, it creates a group of N analogous elementary signals each resulting from the exploration or reading of a respective one of N portions of character obtained by dividing each character to be read in a direction perpendicular to the direction of displacement. The character recognition apparatus of the present invention is particularly characterized in that the character to be recognized forms a part of a series comprising K different characters where K is greater than N (K>N). The apparatus further comprises K operator-generator blocks for generating logic signals, each signal being associated with a respective one of K characters to be recognized. Each of these blocks comprise on one hand, an operator block comprising N multiplier elements each connected to the reading station to receive a respective one of the N elementary analagous signals of a group generated at this station and to multiply this elementary signal by a specific coefficient of the said multiplier element, and a summing element connected to these N multiplier elements to receive the N elementary signals thus multiplied and delivering at its output a single signal of which the amplitude is equal to the algebraic sum of the amplitude of these N multiple signals, and on the other hand, a generator element for a logic signal connected to the summing element to receive the single signal. This generator element is operatively arranged to generate at its output one or the other of two logic signals "1" or "0", determined by whether the amplitude of the single signal is positive or not, respectively. The K operator-generator blocks are distributed in p different assemblies, p being an entire number such that one has:

$$\frac{K}{N} \leq P < \frac{K+N}{N}$$

The specific coefficients of the multiplier elements have values chosen such that, in response to the exploration or reading of a character, when the operator-generator block which is associated with this character delivers a logic signal "1", the operator-generator blocks which relate to the same assembly as the operator-generator block each deliver a logic signal "0", while, in each of the other assemblies, at least two operator-generator blocks each deliver a logic signal "1".

"p" validation means are each associated with a respective one of the p assemblies of operator-generator blocks and each generating in response to the reading of a character, a single validation signal in the case where one only of the operator-generator blocks of the associated assembly delivers a logic signal "1".

"H" and "K"0 identification elements for the characters each are connected to the output of a respective one of the K operator-generator blocks. These K identification elements are distributed in p different assemblies associated with a respective one of the p validation means. Each of the identification elements is connected further to the output of the validation means which is associated with it and generates a single recognition of character signal when it receives at that time, on one hand, a validation signal generated by the validation means and, on the other hand, a logic signal "1" generated by the operator-generator block to which it is connected.

BRIEF DESCRIPTION OF THE DRAWINGS

The invention will be better understood and other objects, details and advantages of the invention will more clearly appear in the following description, given by way of example and not limitation and with reference to the accompanying drawings in which.

DESCRIPTION OF THE PREFERRED EMBODIMENTS

Figure 2:
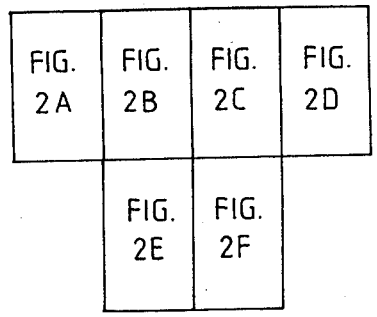
FIG. 2 is made up of FIGS. 2A to 2F which when assembled in the manner indicated in FIG. 2, represent a detailed arrangement of an apparatus for character recognition established in accordance with the invention.
Figure 2A:
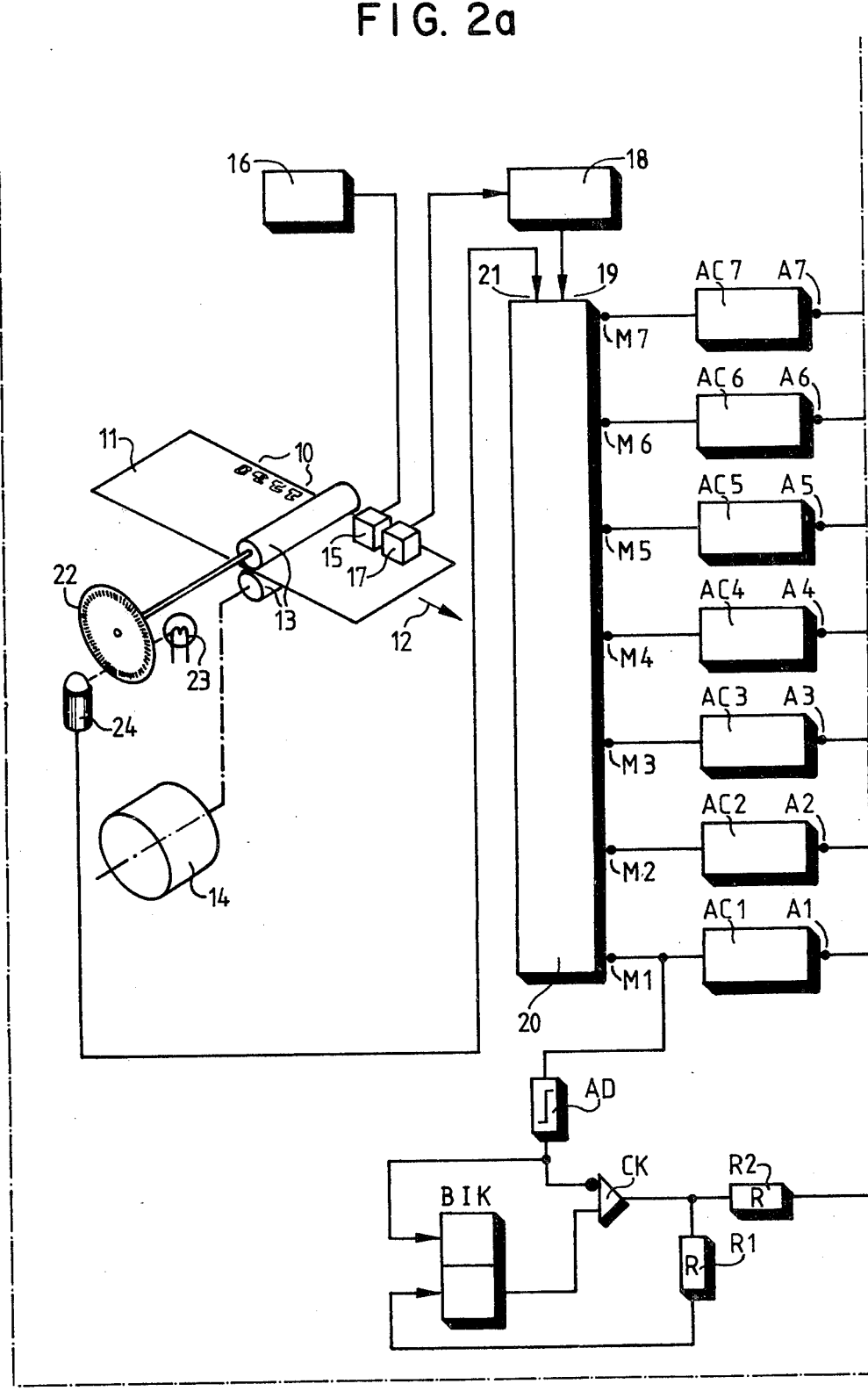
Figure 2B:
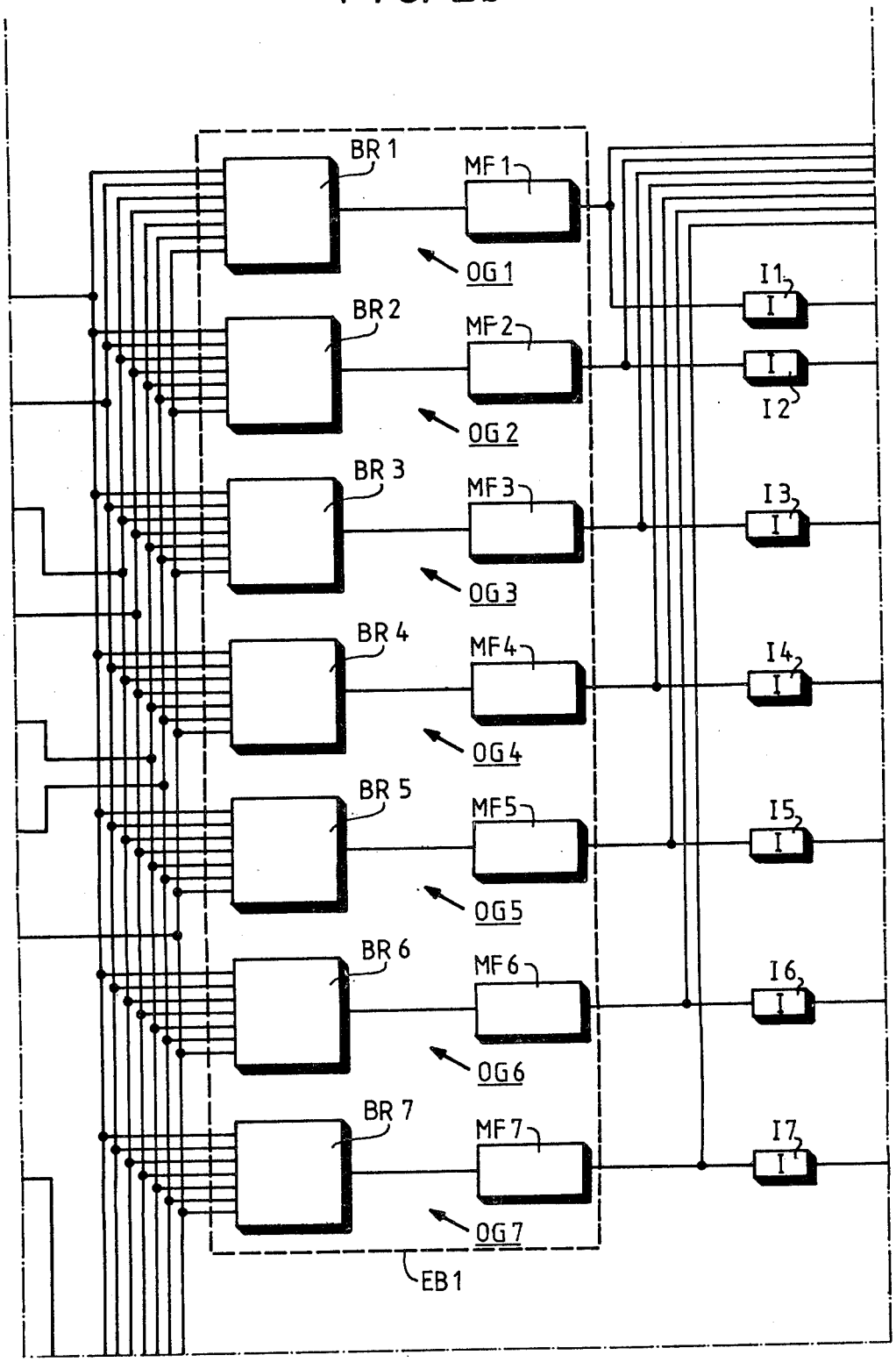
Figure 2C:
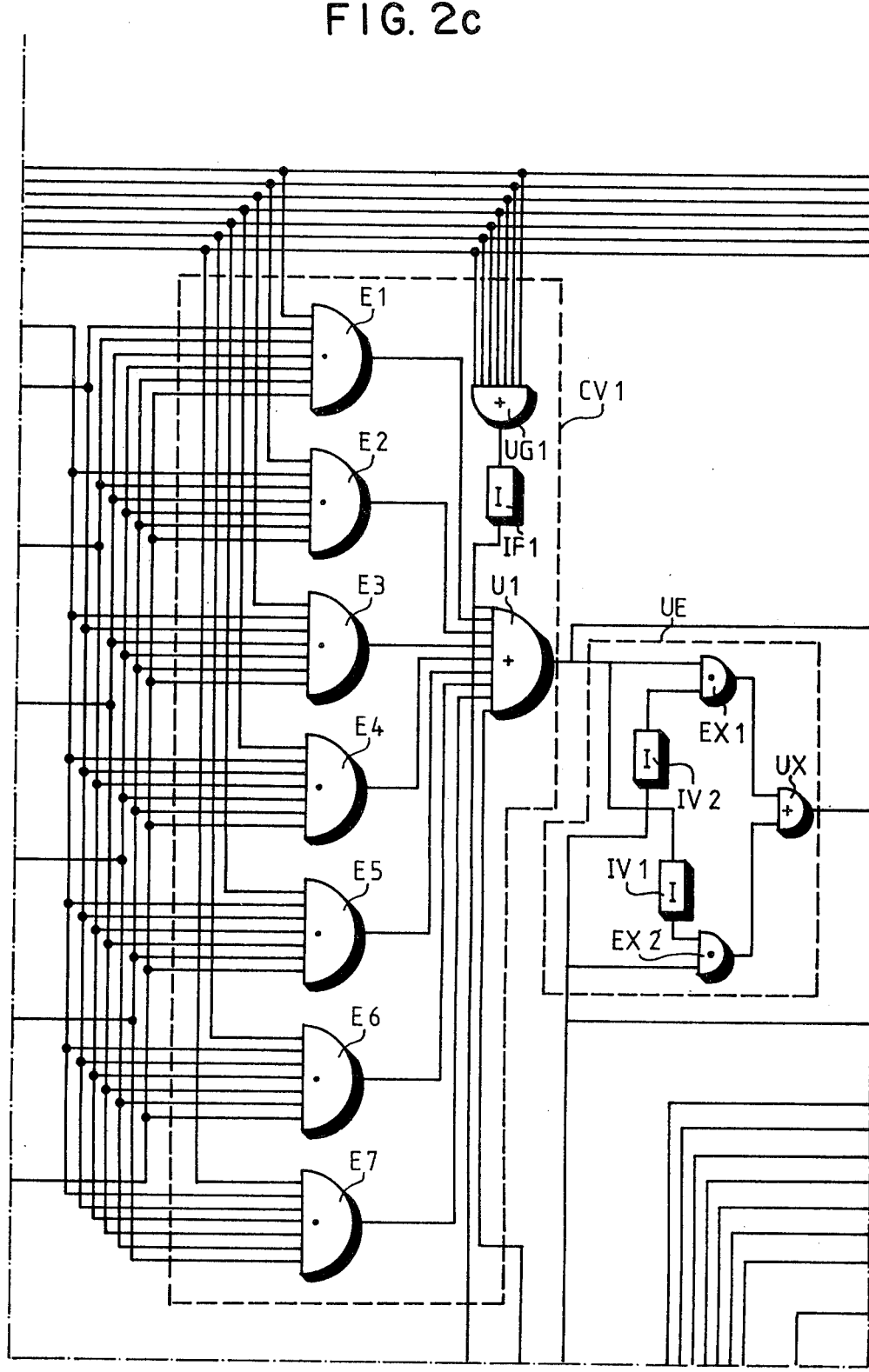
Figure 2D:
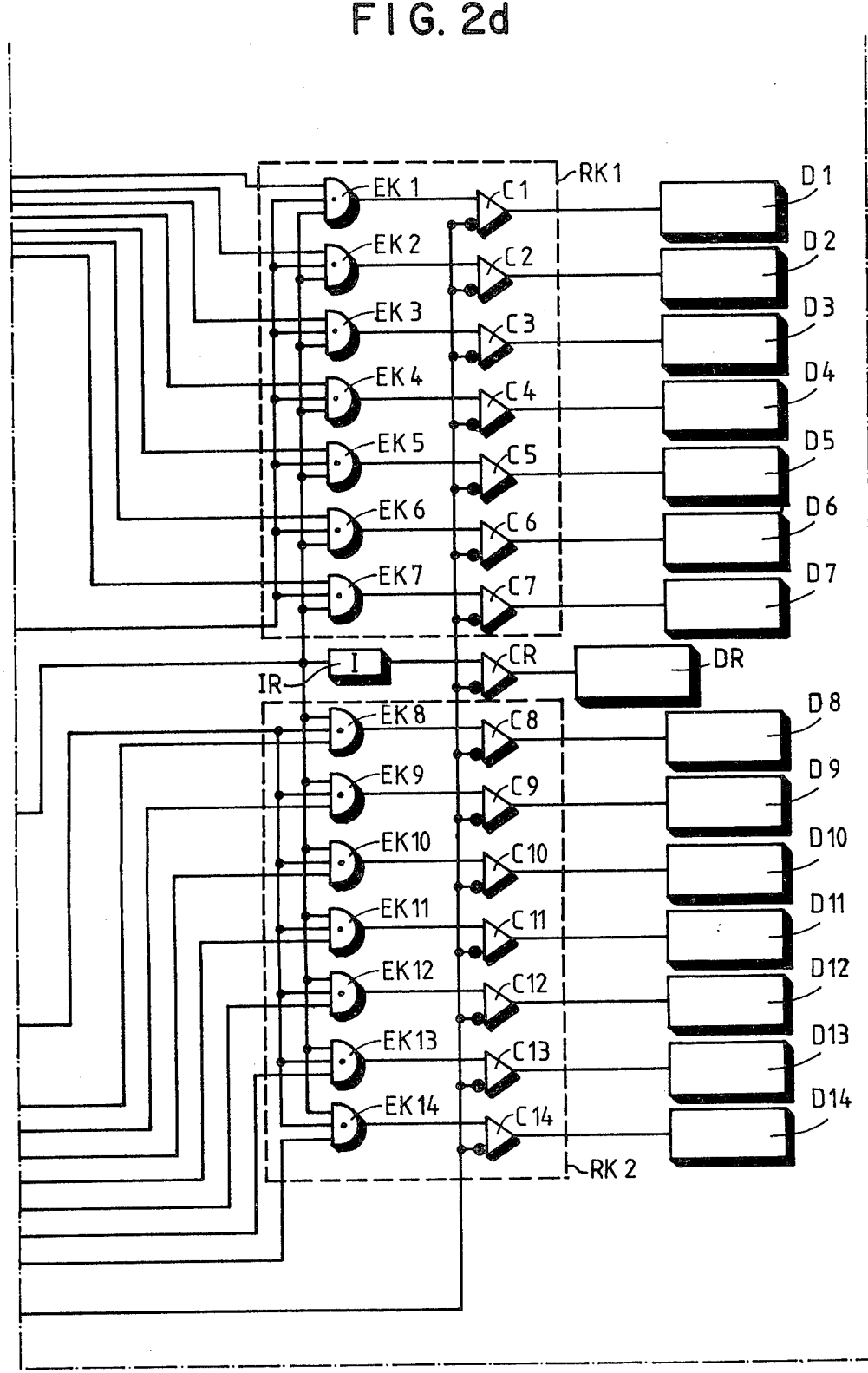
Figure 2E:
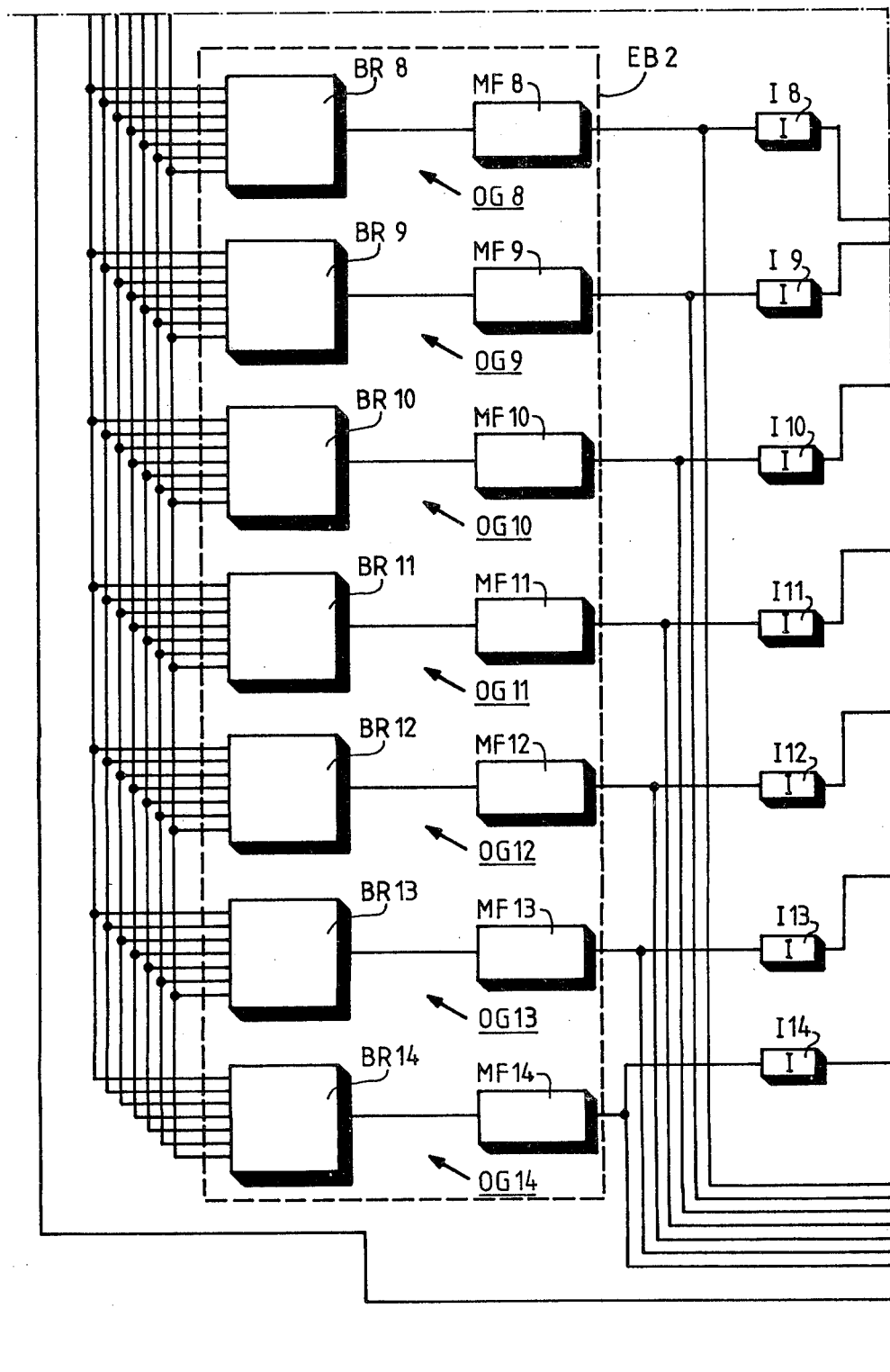
Figure 2F:
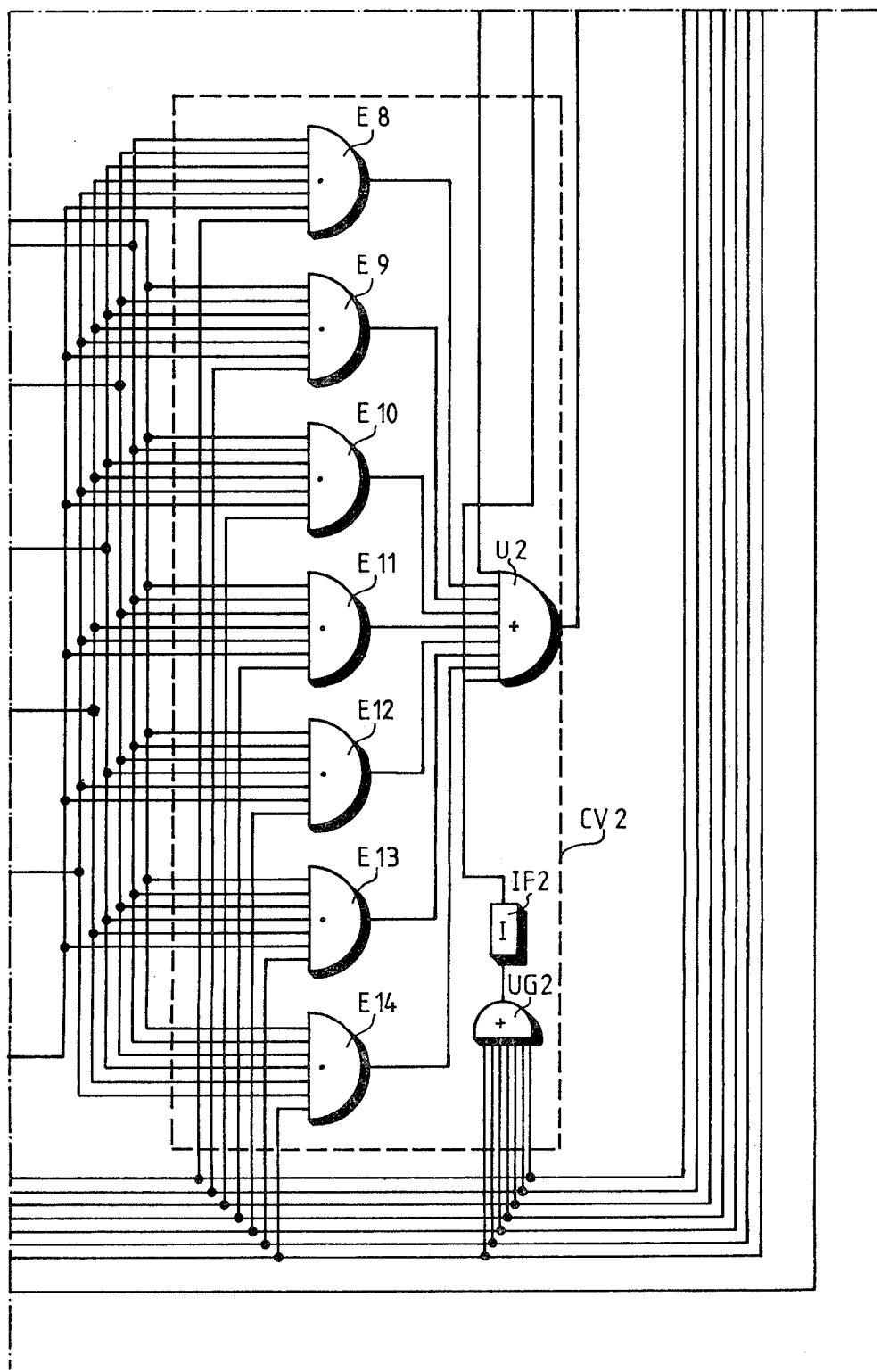
Figure 3A:
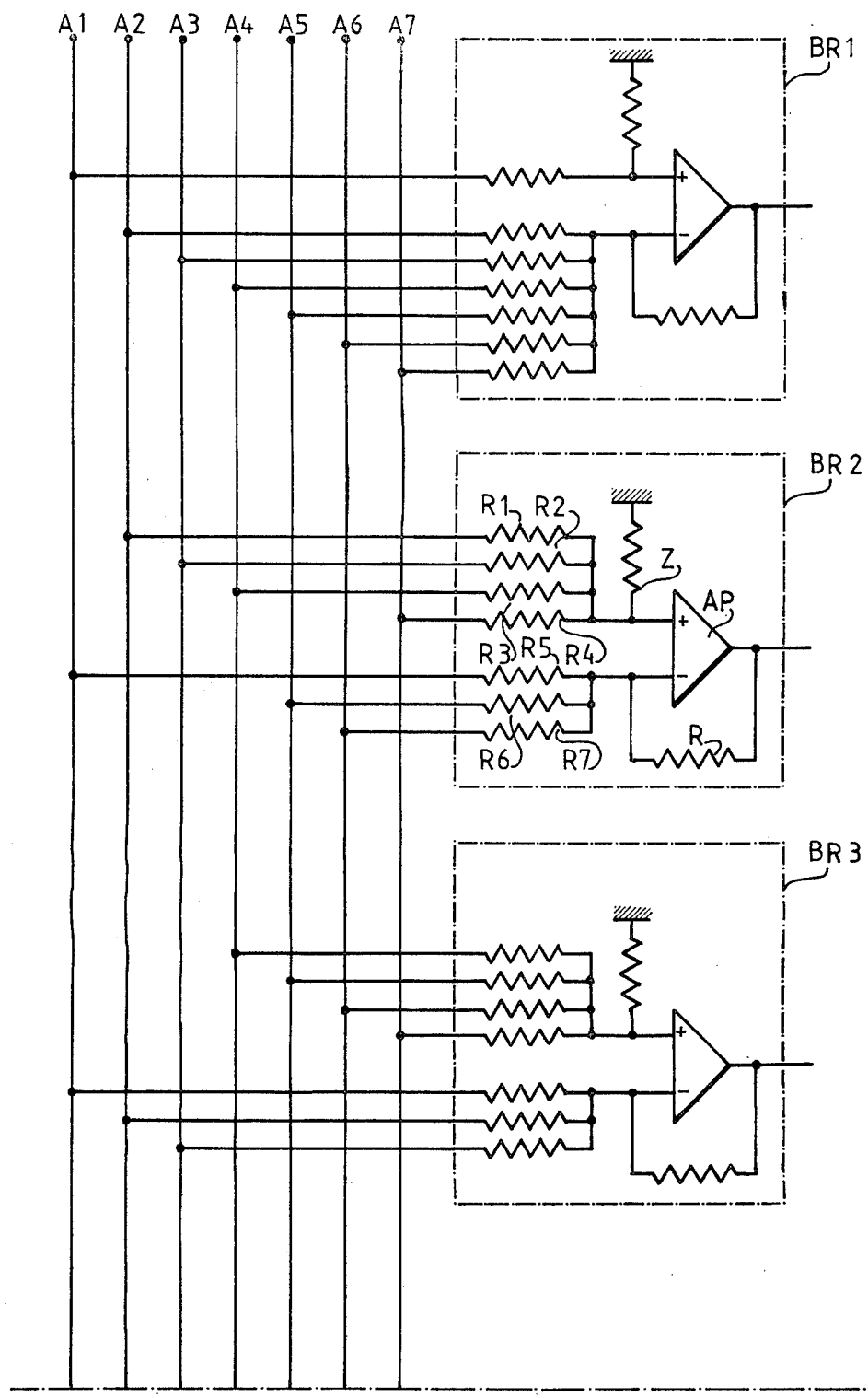
Figure 3B:
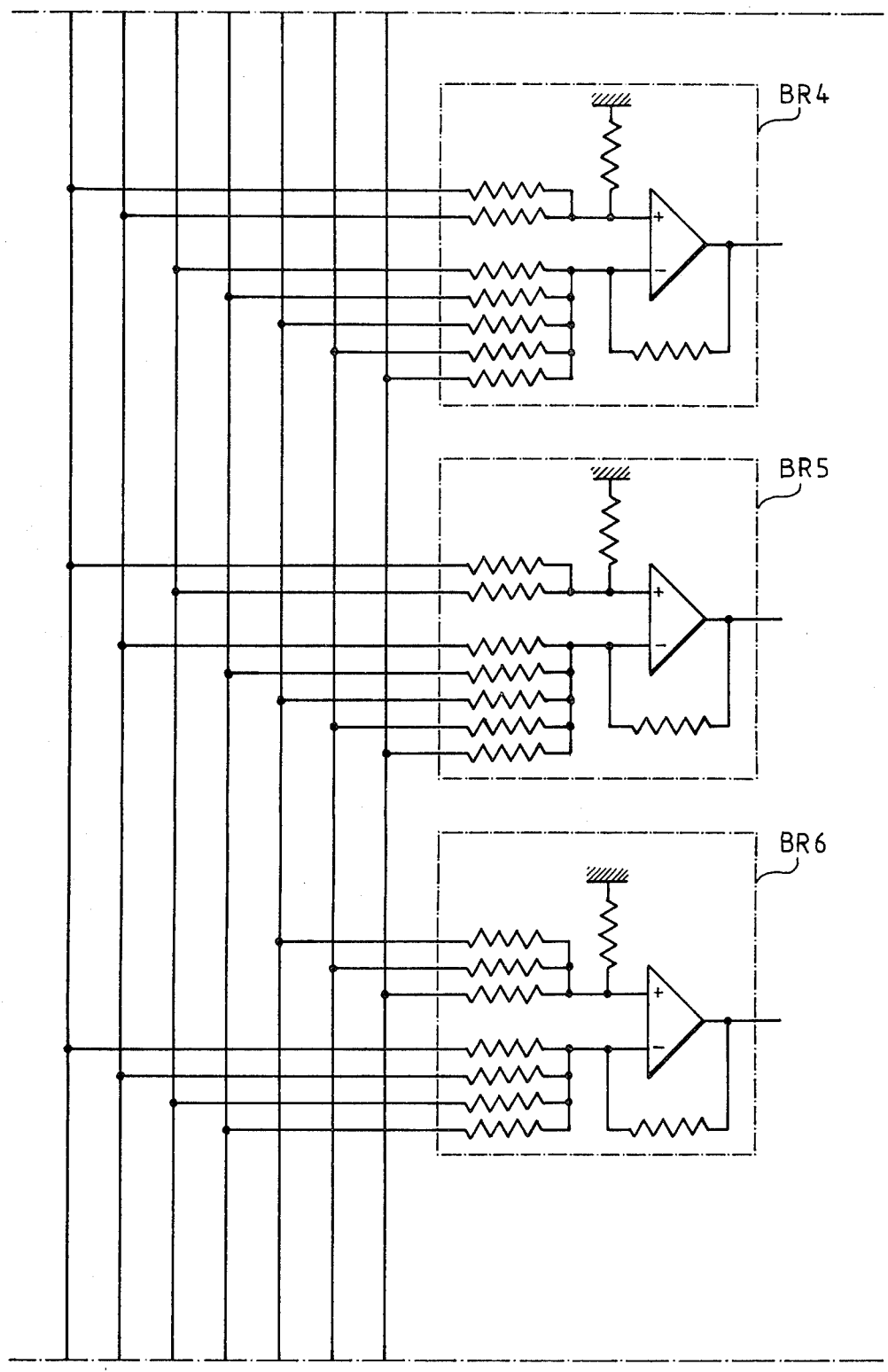
Figure 3C:
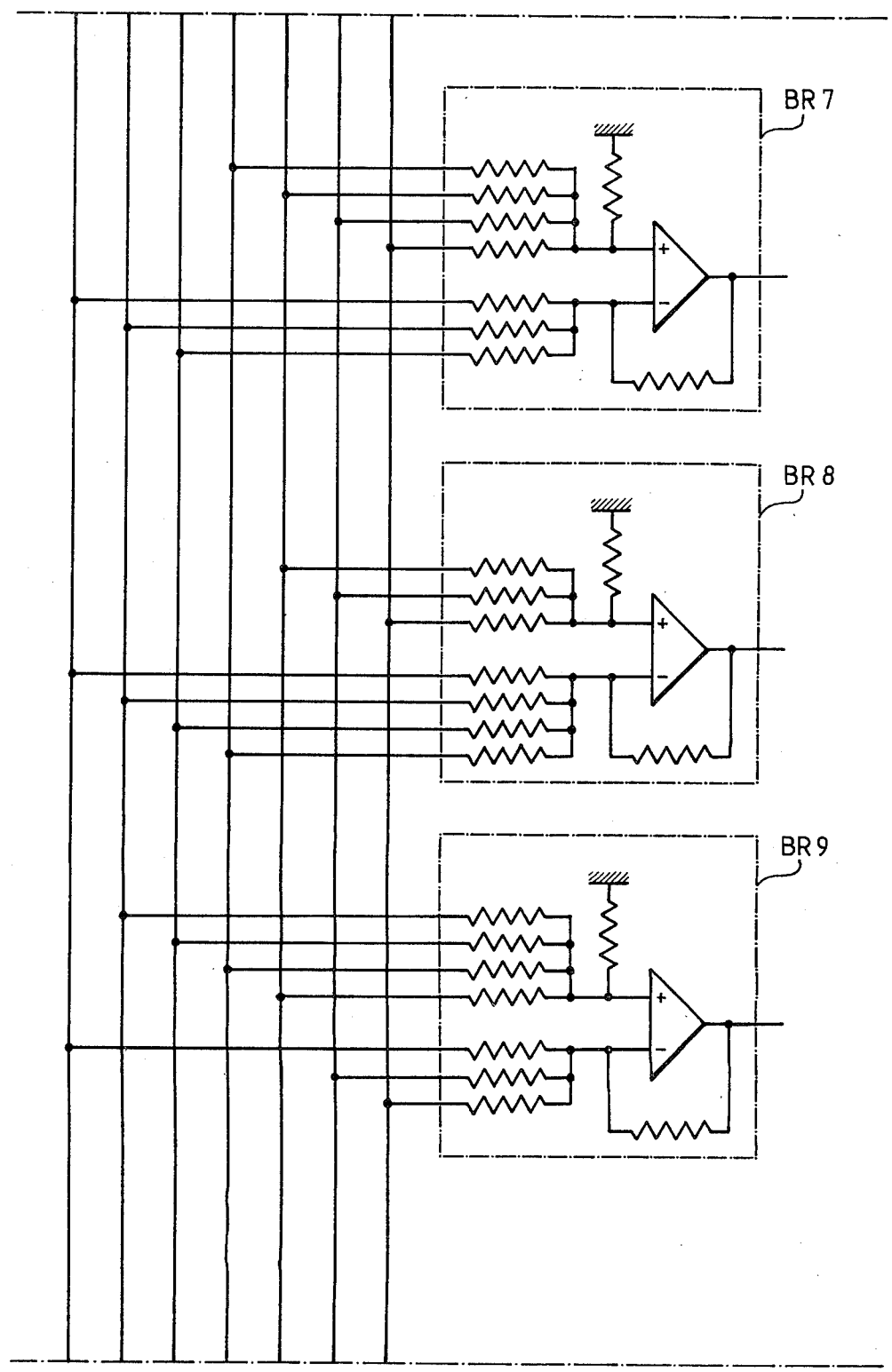
Figure 3D:
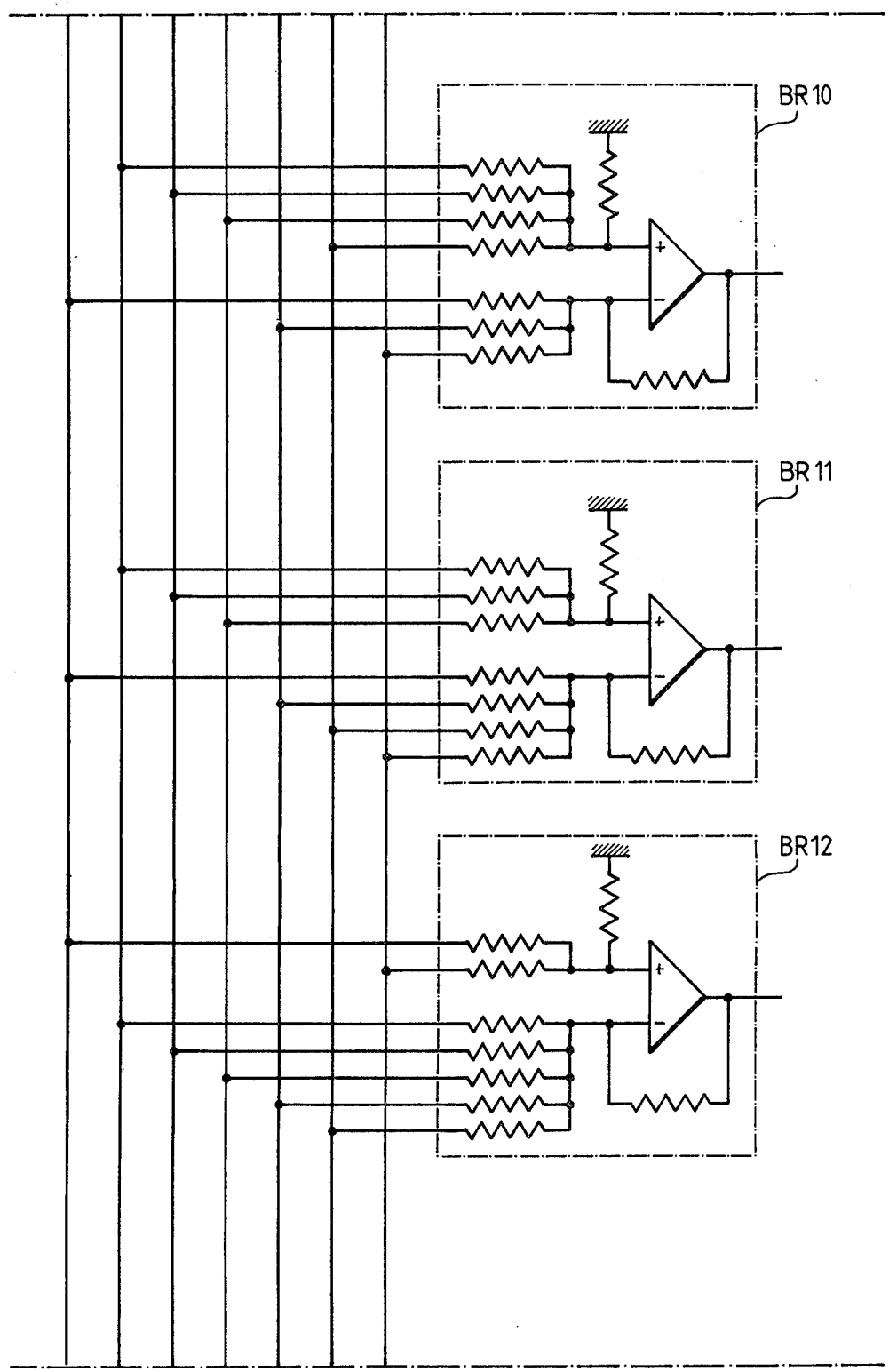
Figure 3E:
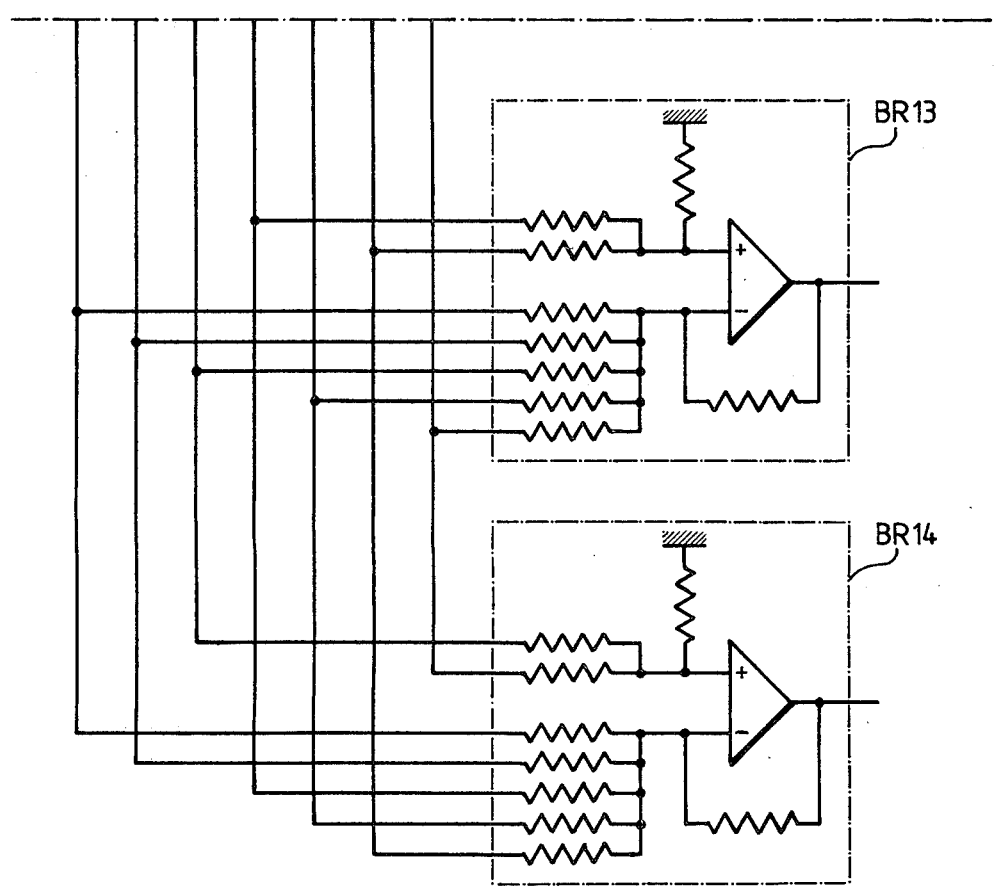

The apparatus for recognition of characters which has been shown in detailed manner in FIGS. 2A to 2F, assembled in the manner indicated in FIG. 2, is designed to recognize the stylized characters in question. These characters, designated by reference 10 in FIG. 2A, are carried by a document 11 which can be considered, for example, as a bank check. Such characters and associated reading may be with regard to any form of document on which it is desired to carry data or information. In the described example, these characters have been printed with magnetizable ink. Thus, as can be seen in FIG. 2A, document 11 is displaced in the direction indicated by arrow 12 by moving means constituted, for example, by driving rollers 13 coupled to an electric motor 14. This moving means causes the characters 10 of document 11 to successively pass first before a magnetization head 15 which is fed with a continuous current by a current source 16, and then before a magnetic reading head 17. Each time that a character passes before head 17, an output signal or form of wave is developed characteristic of the character.

The stylized characters which pass successively before heads 15 and 17 are conceived in a way to offer a sufficient resemblance with the characters actually imprinted while however being sufficiently different one from the others to be able to be identified by the recognition apparatus represented in FIGS. 2A to 2F. To this end, as one can see in FIGS. 1A to 1N, each of these characters has a configuration such that it can be considered as formed by the juxtaposition of portions of character, these portions resulting from an arbitrary division of the character by a certain number of parallel bands, each of these bands containing then a portion, of predetermined value, of the total inked surface of a character.

Consequently, the character signal delivered by the magnetic reading head 17 can be considered as made up of a sequence of elementary signals, each elementary signal corresponding to the exploration or reading of each of the bands containing the portions constituting a character.

Figure 1A:
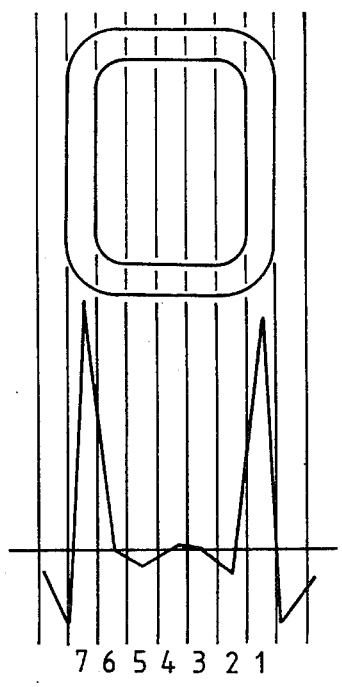
FIG. 1 is made up of FIGS. 1A to 1N which represent a series of stylized characters and the forms of corresponding waves which can be developed and utilized by the character recognition apparatus in accordance with the present invention.
Figure 1B:
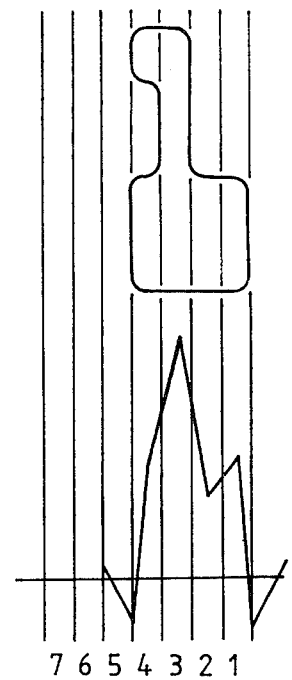
Figure 1C:
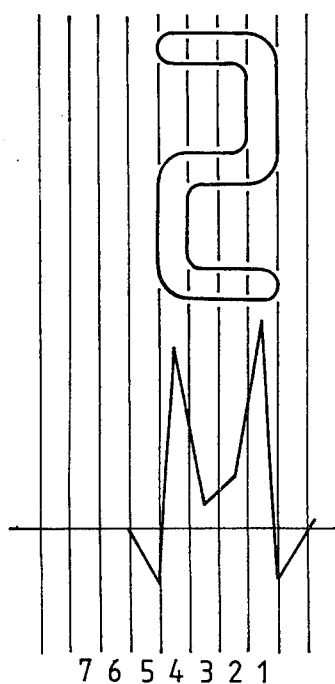
Figure 1D:
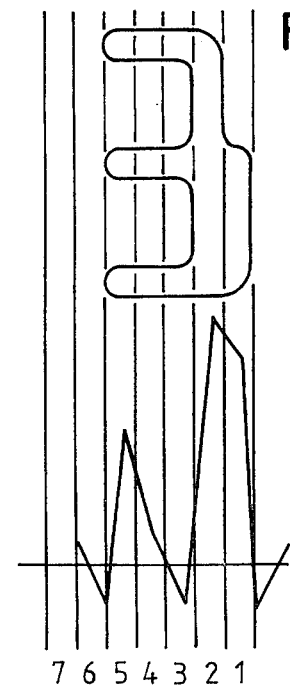
Figure 1E:
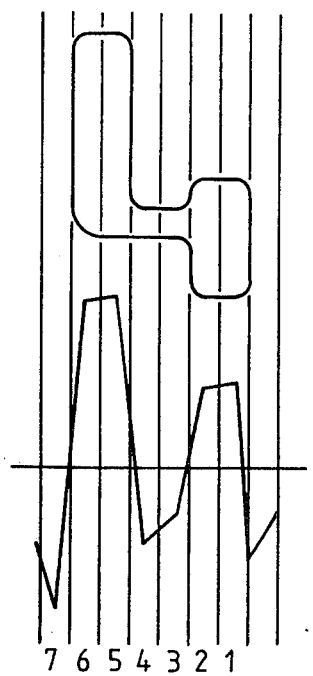
Figure 1F:
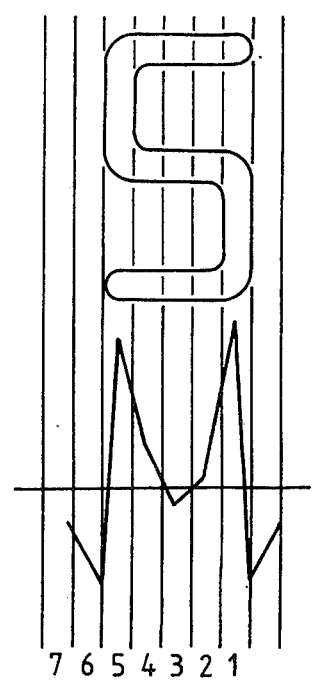
Figure 1G:
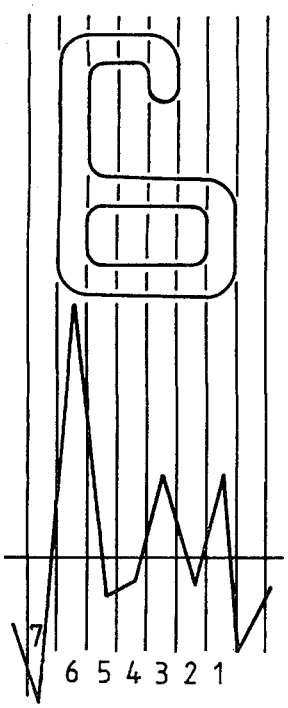
Figure 1H:
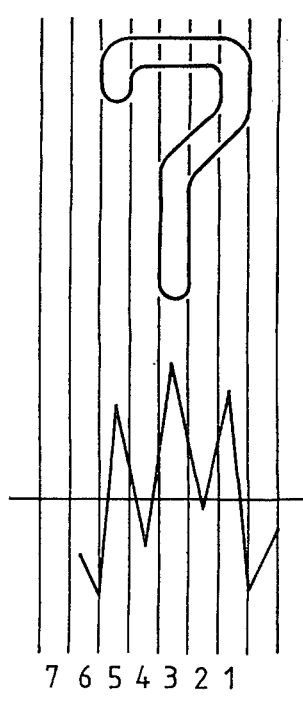
Figure 1I:
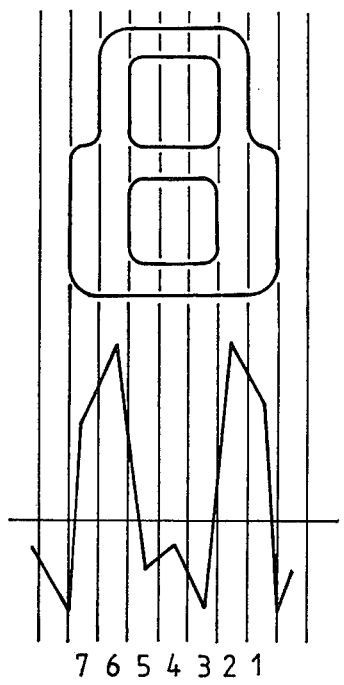
Figure 1J:
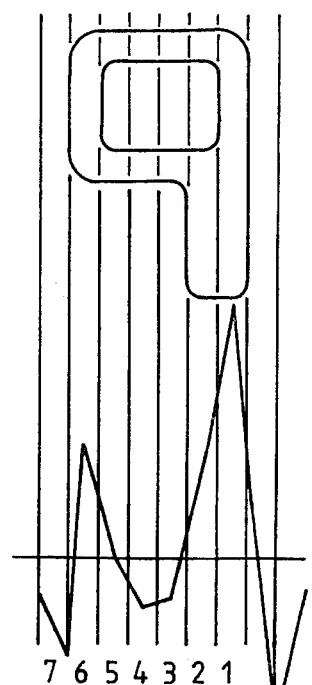
Figure 1K:
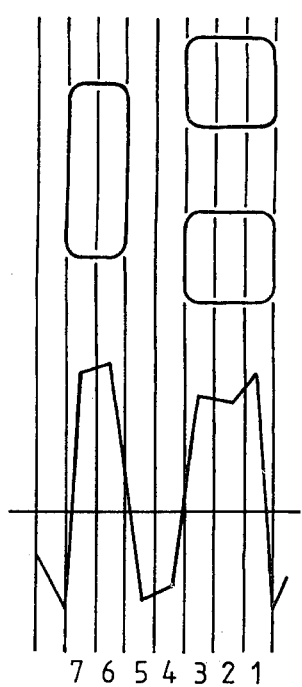
Figure 1L:
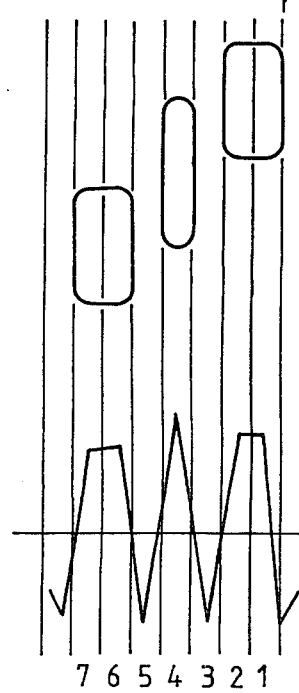
Figure 1M:
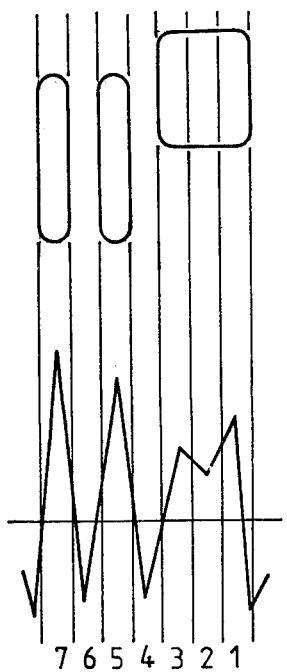
Figure 1N:
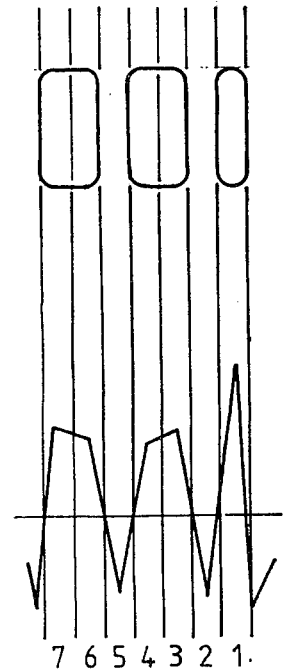

In the example described, these character signals which have been represented in FIGS. 1A to 1N, have been obtained by reading these different portions, preferentially, by means of a reading head comprising at least a magneto-resistant detection element which is sensitive to the intensity of magnetic flux of the magnetized zone which passes before it, and not to the variation of this magnetic flux. Such a reading head is described and shown in the application for patent filed in France on May 13, 1977 and published under No. 2.390.778. The orientation of this reading head is such that its magneto-resistant element, which is in the form of a small band plate, is disposed perpendicularly to the direction of displacement of document 11, that is to say parallel to the bands containing the constituent portions of each character. The width of this small band plate is advantageously less than that of the said bands, while the length of this small band plate is greater than the length of these bands so that, during displacement of the document, each character can be read in its entirety by the small band plate. When no character passes before the band plate, this band plate, which is normally connected to the terminals of a generator delivering a current of intensity I, has an electric resistance or clearly defined value R. When a magnetized character passes before the reading head, the magnetic flux loss of the magnetized zone which is located at the level of this small magneto-resistant element causes a variation $\Delta R$ of the resistance of this element. In this manner, a variation of voltage of value $\Delta V = I.\Delta R$ appears at the terminals of this small band plate or magneto-resistant element. The value of this variation is proportional to the value of magnetic flux loss of this magnetized zone. Thus, during the time of movement of a character before reading head 17, head 17 delivers a voltage of which the amplitude varies proportionally to the number of lines of flux transversing the element. This number is itself a function of the surface of the magnetized zone at the level of the element and of the density of the magnetic particles in the ink and the intensity of the magnetic field applied to magnetize the characters.

It must be noted that in the example described, the reading head which is utilized with its magneto-resistant element, to obtain a voltage wave characteristic of each character investigated is not exclusive to the invention and that this head could be replaced by any other type of conventional reading head capable of creating a voltage wave of which the amplitude varies as a function of the surface of each of the portions of the character which are successively explored by this head. Accordingly, it is possible to utilize, for example, a reading head having optical detection means.

The characters which, in the example described, can be identified by the recognition apparatus illustrated in FIGS. 2A to 2F are a part of an assembly comprising four characters. These characters comprising, as can be seen in FIGS. 1A to 1N, the values 0 to 9 and four special symbols which in the following text will be designated respectively S1, S2, S3 and S4. These characters are not the only ones which could be identified by a recognition apparatus in accordance with the invention and that one could also identify with this apparatus other stylized alpha-numeric characters and symbols, it only being necessary that the configuration of these characters is established in such a way that the voltage wave generated by the reading head resulting from the reading of these different characters would present practically no resemblance between them, i.e. such character can be identified by its own characteristic voltage wave.

It should also be observed that the stylized characters which have been represented in FIGS. 1A to 1N are not all the same size and that certain characters, called large characters, such as characters 0 and 8, for example, are divided by a number N of parallel bands which have been arbitrarily chosen equal to seven. Because of this, these large characters have a configuration which is adaptable to seven parallel bands. On the other bands, other configurations such as the characters 1 and 2, for example, have a configuration which will accept only a part of these seven bands. For this reason, character 2 has a configuration extending over four bands and character 4 has a configuration which extends over six bands. In FIGS. 1A to 1N, the seven bands have been numbered from 1 to 7 in the direction which corresponds to the reading of each character by the reading head, that is to say, in the direction which, in these figures goes from right towards the left. The number N of parallel bands, for the number K of the characters that the recognition apparatus of the invention can identify, should be such that it satisfies the equation $K > N$. Therefore, in the example described where the number K of characters of the group that this recognition apparatus can identify is equal to 14, the number N of parallel bands which has been chosen for the separation of the large characters is equal to 7 and thus responds well to the condition which has just been set forth.

If reference is now made to the arrangement shown in FIGS. 2A to 2F, it will be seen that the output voltage wave or signal created by reading head 17 in response to the exploration of a character is applied to the input of an amplifier 18 the output of which is connected to the input 19 of an analogic delay line 20 having N median contacts, M1–M7 in the illustrated embodiment. The purpose of this delay line is to assure dynamic storing of the entire voltage wave which is applied to its input. This delay line which is normally provided with a non-reflecting terminal comprises seven median contacts M1–M7 for sampling at predetermined times the values of the voltages which appear at the particular points distributed along the delay line. The value of the voltage at each of these points M1–M7 varies according to the propagation in the delay line of the voltage wave which has been applied to the input 19. The delay line utilized in the described example is preferably a delay line in which the propagation of the voltage wave applied to the input 19 occurs under the control of timed clock pulses applied at an input 21. The speed of propagation of this voltage wave is determined by the frequency at which the clock pulses are applied to input 21. This delay line may, for example, be one which is commercially available in the United States from the RETICON Corporation, under their model No. TAD32A.

The clock pulses applied to input 21 of delay line 20 are furnished by a clock generator 24 which delivers these pulses at a cadence proportional to the speed of displacement of document 11. The clock on timing generator 24 utilized in the example described is constituted, as seen in FIG. 2A, by a clock disc 22 which is coupled to driving rollers 13 and which is provided with windows which, at predetermined times, pass a luminous beam emitted by a luminous source 23 and directed toward a photoelectric cell 24. Thus, each time a window of disc 22 passes the luminous beam, an electric clock pulse is created by cell 24 and applied to input 21 of delay line 20. Under these conditions, the voltage wave which is applied to input 19 is propagated in delay line 20 at a speed which is proportional to the cadence of the impulses by cell 24, that is to say, to the speed of displacement of the document.

It is thus possible to store in delay line 20 the total of the voltage wave resulting from the reading of a character, and this storage is effected no matter what the speed at which the document is moved. This speed is, however, limited by the cut-off frequency of amplifier 18 and by the maximum frequency permissible for the clock of the delay line of input 21, provided, however, that this speed should remain constant during the time period in which the character is being read. The number of median contacts of the delay line should be at least equal to the number N of parallel bands which have been arbitrarily chosen for the division of the large characters. The distribution of these N median contacts is established in such a way that, when the totality of the voltage wave resulting from the reading of a large character is stored in the delay line, the potential which appears at each of these N contacts correspond to the amplitude of this voltage wave sampled at each respective one of N points equally distributed along the direction of propagation of this wave.

It is further necessary to indicate that, whatever the size of the character read by the reading head 17, one will consider, in that which follows, that the resulting voltage wave from the reading of this character will be found entirely stored in delay line 20, that is to say perfectly contained in this line, at the precise moment when, by reason of propagation of this voltage wave in this line, the elementary signal which corresponds to the reading of the portion of the character contained in band 1 appears on the median contact M1 of the delay line.

The explanation which will now be given makes it clear that the delay line which is utilized in the example described, in connection with a magneto-resistant reading head, has the advantage of delivering at each of the N median contacts, when the entire voltage wave resulting from the reading of a character is stored in the delay line, a respective one of N elementary signals which each can be considered as resulting from the reading of the portion of the character which is contained in a corresponding one of the N parallel bands, and that whatever the speed of displacement of document 11 may be, providing however that this speed remains constant during the reading of the character. This type of delay line is not exclusive of the present invention and that other delay lines may be utilized in the example described such as, for example, the type incidentally described in French Patent No. 1,248,226. In this last case, naturally, the generator described above would no longer have utility and could be eliminated.

Figure 3:
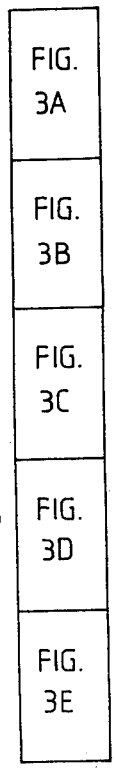
FIG. 3 is made up of FIGS. 3A to 3E, which when they are assembled in the manner indicated in FIG. 3, represent an embodiment of the operator blocks which are a part of the arrangement shown in FIGS. 2A to 2F.

In the embodiment illustrated by FIGS. 2A to 2F, the identifying apparatus in accordance with the invention comprises again an assembly of seven correlation amplifiers AC1 to AC7, each having a respective input connected to a respective one of seven median contacts M1 to M7 of delay line 20 and are provided each with a respective one of seven outputs A1 to A7. These amplifiers, which are of known structure, are used to correct in a known manner the elementary signal applied at their output for the purpose of suppressing the attenuation factors introduced by the delay line between the signals emitted by the median contacts and the signal entering by input 19, these factors furthermore not being equal. The elementary signals thus corrected by these seven corrector amplifiers are then applied to the inputs of four operator blocks designated in FIGS. 2B and 2E, by the references BR1 to BR14. Each of these operator blocks BR1 to BR14 is associated with a respective one of the characters 0, 1, 2, 3 ,7, S1, S3, 4, 5, 6, 8, 9, S2 and S4 described above. As can be seen from FIGS. 2A, 2B and 2E, each of the operator blocks is provided with a single output and a number of inputs equal to those of the elementary signals delivered by the delay line 20 (seven entries in the described example), each of these entries being connected to the output of a respective one of the corrector amplifier. The structure and manner of connection of each of the operator blocks utilized in the example described have been shown in detail in FIGS. 3A to 3E assembled in the manner indicated in FIG. 3.

Referring then to FIGS. 3A to 3E thus assembled, it is seen that each operator block in the form of an operational amplifier AP having a very large open loop gain connected in known manner to the reaction resistance R and of recall V so that with a group of seven resistances R1 to R7 of which certain resistances being a part of a first assembly comprising n resistances (such as the resistances R1 to R4 of operator block BR2, for example), are connected each between the non-input inverting (+) of amplifier AP and one of n of the outputs A1 to A7 above, n being a number between 1 and 7, and of which the other resistances, forming a part of a second assembly comprising 7−n resistances (such as resistances R5 to R7 of operator block BR2, for example), are connected each between the inverting input (−) of amplifier AP and one of the 7−n others of inputs 1A to A7 above. In a general way, it is known that if one designates by $e_1, e_2, \ldots, e_n$ the values of the applied voltages to the non-inverting input through the resistances $R_1, R_2 \ldots, R_n$ of this first assembly and by $e_{n+1}, e_{n+2} \ldots, e_7$ the values of the voltages applied at the inverting input through resistances $R_{n+1}, R_{n+2} \ldots, R_7$ of the second assembly, the voltage s delivered at the output of amplifier AP will have the value:

$$s = K\left[r\left(\frac{e_1}{r_1} + \frac{e_2}{r_2} + \ldots + \frac{e_n}{r_n}\right)\right] - r\left(\frac{e_{n+1}}{r_{n+1}} + \frac{e_{n+2}}{r_{n+2}} + \ldots + \frac{e_7}{r_7}\right)$$

with:

$$K = \frac{\frac{1}{r} + \frac{1}{r_{n+1}} + \frac{1}{r_{n+2}} + \ldots + \frac{1}{r_7}}{\frac{1}{z} + \frac{1}{r_1} + \frac{1}{r_2} + \ldots + \frac{1}{r_n}}$$

$r_1, r_2, \ldots r_7$, $r$ and $z$ designating the values of the impedences of the different resistances R2, R2 ..., R7, R and Z. It follows, for example, that the voltage s delivered at the output of the amplifier of operator block BR 2 has for a value:

$$s = K\left[r\left(\frac{v_2}{r_1} + \frac{v_3}{r_2} + \frac{v_4}{r_3} + \frac{v_7}{r_4}\right)\right] - r\left(\frac{v_1}{r_5} + \frac{v_5}{r_6} + \frac{v_6}{r_7}\right)$$

with:

$$K = \frac{\frac{1}{r} + \frac{1}{r_5} + \frac{1}{r_6} + \frac{1}{r_7}}{\frac{1}{z} + \frac{1}{r_1} + \frac{1}{r_2} + \frac{1}{r_3} + \frac{1}{r_4}}$$

Figure 4:
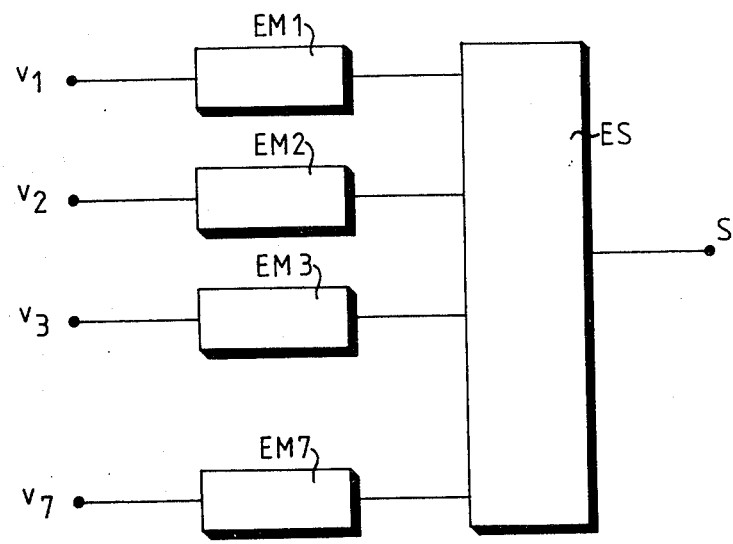
FIG. 4 shows a general plan of a circuit which can be utilized for obtaining the operator blocks which are part of the arrangement shown in FIGS. 2A to 2F.

$v_1, v_2, v_7$ representing the values of voltages delivered at the outputs respectively $A_1, A_2, \ldots, A_7$ of the amplifiers AC1, AC2, ..., AC7. In these conditions, all occurs as if each of the operator blocks BR1 to BR14 possesses a structure of the cell type which is represented, in a general way, by FIG. 4, this structure comprising, as shown by FIG. 4, on one hand an assembly of seven multiplying elements EM1 to EM7 each provided with an input connected each to one respectively of the outputs A1 to A7 of the amplifiers AC1 to AC7 to receive a respective one of the voltages $v_1$ to $v_7$ delivered by these outputs. Each of these multiplier elements is used to multiply the voltage that it receives by a specific coefficient of the associated multiplier element. On the other hand, a summing element ES comprising seven entries connected each to one respectively of the outputs of the multiplier elements EM1 to EM7 to receive the seven voltages which have been multiplied by these multiplier elements. This summing element ES delivers at its output S a single signal of which the amplitude s is equal to the algebraic sum of the voltages thus multiplied. It should be noted that each of the specific coefficients $k_1, k_2, k_3 \ldots, k_7$ of the multiplier elements respectively, EM1, EM2, EM3, ..., EM7, is either positive or negative in accordance with the voltage to be multiplied by this specific coefficient and is, in the embodiment of the corresponding operator block shown in FIGS. 3A to 3E, applied on the non-inverting (+) input or on the inverting input (−) of the operational amplifier of this block. Thus, the amplitude of the signal delivered at the output of each of the operator blocks BR1 to BR14 is expressed simply by:

$$s = k_1v_1 + k_2v_2 + k_3v_3 + k_4v_4 + k_5v_5 + k_6v_6 + k_7v_7$$

the values of the specific coefficients $k_1, k_2, k_3, \ldots, k_7$ of the same operator block being, in general, different from one operator block to the other. It should be noted on this subject that the values of the different resistances R,Z and R1 to R7 of each of the operator blocks BR1 to BR14 are chosen in such a way that, in the described example, the seven specific coefficients of each block have the values indicated in the following table:

TABLE I

| Bloc opérateur | $k_1$ | $k_2$ | $k_3$ | $k_4$ | $k_5$ | $k_6$ | $k_7$ |
|---|---|---|---|---|---|---|---|
| BR1 | 1,4 | −1 | −0,3 | −4,1 | −8 | −9,6 | −0,1 |
| BR2 | −2,3 | 0,3 | 2 | 0,1 | −4,8 | −6,8 | 1,5 |
| BR3 | −1,7 | −1,9 | −2,3 | 4,9 | 4,8 | 6,5 | 0,4 |
| BR4 | 0,6 | 2,5 | −1 | −3,4 | −5,3 | −6,5 | −2,3 |
| BR5 | 3,2 | −2,5 | 0,2 | −6,2 | −3 | −2 | −5,8 |
| BR6 | −1,7 | −0,7 | −0,8 | −0,3 | 0,2 | 5,6 | 0,8 |
| BR7 | −3,9 | −0,5 | −1,1 | 2,2 | 5,5 | 1,8 | 3,5 |
| BR8 | −2,3 | −3,6 | −3,4 | −9,6 | 1,3 | 1 | 7,5 |
| BR9 | −0,3 | 3,2 | 2,4 | 9,2 | 1,7 | −2,2 | −8,5 |
| BR10 | −1,8 | 2,4 | 2,5 | 7,6 | −1,6 | 1,5 | −11,1 |
| BR11 | −1,9 | 3,2 | 1 | 0,3 | −0,9 | −1,2 | −1,7 |
| BR12 | 2,1 | −3,15 | −2,3 | −13 | −3,4 | −2,1 | 3 |
| BR13 | −1,5 | −0,6 | −3,7 | 4,3 | −1 | 0,3 | −3 |
| BR14 | −0,57 | −3,5 | 0,8 | −10,1 | −1 | −1,4 | 10,3 |

Thus, it can be stated, by observing in FIGS. 3A to 3E, the manner in which the different operator blocks BR1 to BR14 are connected to the outputs A1 to A7 of the amplifiers AC1 to AC7, the specific coefficients which, in Table I, are positive corresponding to the signals which, delivered by outputs A1 to A7, are applied on the non-inverting (+) input of the amplifier AP of each operator block, while the specific coefficients which, in Table I, are negative corresponding to the signals which, delivered by outputs A1 to A7, are applied on the inverting (−) input of the amplifier AP of each operator block. Thus, for example, the specific coefficients $k_2, k_3, k_4$ and $k_7$ which, relative to the operator block BR2, are positive corresponding to the signals which, delivered by the outputs $A_2, A_3, A_4$ and $A_7$ are applied on the non-inverting input (+) of the amplifier AP of the operator block BR2, while the specific coefficients $k_1, k_5$ and $k_6$ which, relative to this operator block, are negative corresponding to the signals which, delivered by the outputs $A_1, A_5$ and $A_6$, are applied on the inverting (−) of the amplifier AP of this operator block. In these conditions, if $v_1, v_2, \ldots, v_7$ represent the values of the voltages delivered by the outputs $A_1, A_2, \ldots, A_7$ then the voltage wave resulting from the reading of a character is found entirely stored in delay line 20, that is to say, completely contained in this line, and if $s_1, s_2, s_3, \ldots, s_{14}$ designate the amplitudes of the signals delivered at the output of the operator blocks respectively BR1, BR2, BR3, ... BR14 when these signals $v_1$ to $v_7$ are applied to the inputs of these operator blocks, the amplitude of the signals which will appear at the output of the operator block BR2 is expressed by:

$$s_2 = -2,3v_1 + 0,3v_2 + 2v_3 + 0,1v_4 - 4,8v_5 - 6,8v_6 + 1,5v_7$$

In the same manner, the amplitude of the signal appearing at the output of operator block BR12, for example, will be given by:

$$s_{12} = 2,1v_1 - 3,15v_2 - 2,3v_3 - 13v_4 - 3,4v_5 - 2,1v_6 + 3v_7$$

The values of the voltages $v_2$ to $v_7$ which are delivered by the outputs $A_1$ to $A_7$, when the voltage wave resulting from the reading of a character is completely contained in the delay line 20, depends naturally on the type of character which has been read. Thus, in the example described, the values of voltages $v_1$ to $v_7$ obtained during the reading of each of the fourteen stylized characters discussed above are those which are shown (in volts) in the following table:

TABLE II

| caractère | $v_1$ | $v_2$ | $v_3$ | $v_4$ | $v_5$ | $v_6$ | $v_7$ |
|---|---|---|---|---|---|---|---|
| 0 | 0,815 | −0,0275 | 0 | 0,0275 | 0,0025 | 0 | 0,605 |
| 1 | 0,1725 | 0,1375 | 0,6725 | 0,2225 | 0 | 0 | 0 |
| 2 | 0,465 | 0,025 | 0,03 | 0,395 | 0 | 0 | 0 |
| 3 | 0,335 | 0,575 | 0,0075 | 0,07 | 0,08 | 0 | 0 |
| 4 | 0,2875 | 0,21 | −0,0825 | −0,11 | 0,4375 | 0,515 | 0 |
| 5 | 0,4175 | 0,0275 | 0,0325 | 0,0325 | 0,3825 | 0 | 0 |
| 6 | 0,325 | 0,05 | 0,1925 | −0,005 | −0,0575 | 0,635 | 0 |
| 7 | 0,385 | 0,0325 | 0,4275 | −0,955 | 0,2025 | 0 | 0 |
| 8 | 0,325 | 0,805 | −0,145 | −0,0275 | −0,0825 | 0,3775 | 0,2225 |
| 9 | 0,645 | 0,245 | −0,095 | −0,0725 | 0,0225 | 0,325 | 0,005 |
| S1 | 0,36 | 0,2525 | 0,27 | −0,1375 | −0,135 | 0,2925 | 0,3925 |
| S2 | 0,365 | 0,11 | −0,265 | 0,2275 | −0,2275 | 0,23 | 0,215 |
| S3 | 0,345 | 0,17 | 0,175 | −0,195 | 0,36 | −0,0875 | 0,35 |
| S4 | 0,2775 | −0,0775 | 0,23 | 0,17 | −0,17 | 0,19 | 0,245 |

In view of the values of the voltages $v_1$ to $v_7$ which are indicated in Table II, it is then possible to know the amplitudes of the signals which appear on the outputs of the operator blocks BR1 to BR14, in response to the reading of each of the forty stylized characters as above. Thus, for example, if the character read is the character "0", the amplitude of the signal which appears at the output of operator block BR2 is equal to:

$$s_2 = -(2,3 \times 0,815) + (0,3 \times -0,0275) + (2 \times 0) + (0,1 \times 0,0275) - (4,8 \times 0,0025) - (6,8 \times 0) + (1,5 \times 0,605)$$

or:

$$s_2 = -1,8745 - 0,008 + 0,00275 - 0,012 + 0,907$$

or finally:

$$s_2 \simeq -0,984 \text{ volt}$$

In the same manner one will obtain for the amplitude of the signal appearing at the output of operator block BR12, in response to the reading of the same character "0":

$$s_{12} = (2,1 \times 0,815) - (3,15 \times -0,0275) - (2,3 \times 0) - (13 \times 0,0275) - (3,4 \times 0,0025) - (2,1 \times 0) + (3 \times 0,605)$$

or $$s_{12} = 1,711 + 0,0866 - 0,357 - 0,008 + 1,815$$

or finally:

$$s_{12} \simeq 3,25 \text{ volts.}$$

In operating in the manner which has just been described, one sees that, in view of the values given in Tables I and II, it is possible to establish the values of the amplitudes of the signals which appear on the outputs of the operator blocks BR1 to BR14, in response to the reading of each of the forty stylized characters above-mentioned, these values being those which are indicated (in volts) in the following tables (see Tables III and IV).

For reasons of simplification, the values of the voltages which are indicated in Tables III and IV are, not exact values by precise calculation carried out with the values in Tables I and II, but only rounded off, to about 0.1 volts. Thus, for example, the value of 3.25 volts, the amplitude of signal appearing at the output of operator block BR12, in response to the reading of the character "0" has been rounded to 3.2 volts in Table IV.

TABLE III

| caractères | $s_1$ | $s_2$ | $s_3$ | $s_4$ | $s_5$ | $s_6$ | $s_7$ |
|---|---|---|---|---|---|---|---|
| 0 | +1 | −1 | −1 | −1 | −1 | −1 | −1 |
| 1 | −1 | +1 | −1 | −1 | −1 | −1 | −1 |
| 2 | −1 | −1 | +1 | −1 | −1 | −1 | −1 |
| 3 | −1 | −1 | −1 | +1 | −1 | −1 | −1 |
| 4 | −7,8 | −6,4 | +4,2 | −4,5 | −1,3 | +2,4 | +1,9 |
| 5 | −2,6 | −2,7 | +1,2 | −1,8 | 0 | −0,7 | +0,5 |
| 6 | −5,2 | −4,4 | +2,7 | −3,7 | −0,1 | +2,8 | −0,7 |
| 7 | −1 | −1 | −1 | −1 | +1 | −1 | −1 |
| 8 | −3,2 | −2,6 | +0,3 | 0 | −2,6 | +1,3 | −0,6 |
| 9 | −2,3 | −4 | +0,5 | −0,9 | +1,1 | +0,7 | −1,9 |
| S1 | −1 | −1 | −1 | −1 | −1 | +1 | −1 |
| S2 | −0,8 | −1,5 | +1,4 | −0,8 | −1,6 | +0,8 | −0,8 |
| S3 | −1 | −1 | −1 | −1 | −1 | −1 | +1 |
| S4 | −0,8 | −0,3 | +0,5 | −1,7 | −1,2 | +0,6 | −0,7 |

TABLE IV

| caractères | $s_8$ | $s_9$ | $s_{10}$ | $s_{11}$ | $s_{12}$ | $s_{13}$ | $s_{14}$ |
|---|---|---|---|---|---|---|---|
| 0 | +2,5 | −5,2 | −8 | −2,7 | +3,2 | −2,9 | +5,7 |
| 1 | −5,3 | +4 | +3,4 | +0,8 | −4,5 | −1,9 | −2,3 |
| 2 | −5 | +3,6 | +2,3 | −0,6 | −4,3 | +0,9 | −4,3 |
| 3 | −3,4 | +2,5 | +1,2 | +1,2 | −2,3 | −0,6 | −3 |
| 4 | +1 | −1 | −1 | −1 | −1 | −1 | −1 |
| 5 | −1 | +1 | −1 | −1 | −1 | −1 | −1 |
| 6 | −1 | −1 | +1 | −1 | −1 | −1 | −1 |
| 7 | −1,7 | +0,8 | −0,3 | −0,4 | −0,2 | −2,6 | +0,4 |
| 8 | −1 | −1 | −1 | +1 | −1 | −1 | −1 |
| 9 | −1 | −1 | −1 | −1 | +1 | −1 | −1 |
| S1 | +1,7 | −4,1 | −4,1 | −0,5 | +2,1 | −3,2 | +4,4 |
| S2 | −1 | −1 | −1 | −1 | −1 | +1 | −1 |
| S3 | +2,9 | −3,1 | −5,8 | −0,8 | +2,3 | −3,5 | +4,7 |
| S4 | −1 | −1 | −1 | −1 | −1 | −1 | +1 |

With reference now to the embodiment shown in FIGS. 2A to 2F, at the output of each of the operator blocks BR1 to BR14, there is connected a respective one of fourteen generator elements of logic signals MF1 to MF14. Each of these generator elements of logic signals is set up to deliver at its output a positive voltage of predetermined amplitude each time that its input is raised to a positive potential of any value. The positive voltage delivered to the output of any one of these generator elements exists longer than the potential at the input of this element remains positive. Each of these generator elements is of known structure and can be consituted, for example, by a comparator circuit with a threshold of the type which is commercialized as A 339 A by Fairchild Camera and Instrument Corporation. One will consider that the positive voltage which appears at the output of any one of the generator elements, when the input of this element is at a positive potential, is equal to +1 volt and represents conventionally a logic signal "1". Further, one will consider that, the absence of positive voltage at the output of a generator element when the input of this element is not raised to a positive potential, represents conventionally a logic signal "0". Under these conditions, it is seen that, if one designates by $g_1, g_2, \ldots, g_{14}$ the logic signals delivered by each respective one of the generator elements MF1, MF2, ..., MF14, these logic signals will take, in response to the reading of each of the forty stylized characters, binary values which, reduced from those given in Tables III and IV, are shown in the following table (see Table V).

TABLE V

| caractères | $g_1$ | $g_2$ | $g_3$ | $g_4$ | $g_5$ | $g_6$ | $g_7$ | $g_8$ | $g_9$ | $g_{10}$ | $g_{11}$ | $g_{12}$ | $g_{13}$ | $g_{14}$ |
|---|---|---|---|---|---|---|---|---|---|---|---|---|---|---|
| 0 | 1 | 0 | 0 | 0 | 0 | 0 | 0 | 1 | 0 | 0 | 0 | 1 | 0 | 1 |
| 1 | 0 | 1 | 0 | 0 | 0 | 0 | 0 | 0 | 1 | 1 | 1 | 0 | 0 | 0 |
| 2 | 0 | 0 | 1 | 0 | 0 | 0 | 0 | 0 | 1 | 1 | 0 | 0 | 1 | 0 |
| 3 | 0 | 0 | 0 | 1 | 0 | 0 | 0 | 0 | 1 | 1 | 1 | 0 | 0 | 0 |
| 4 | 0 | 0 | 1 | 0 | 0 | 1 | 1 | 1 | 0 | 0 | 0 | 0 | 0 | 0 |
| 5 | 0 | 0 | 1 | 0 | 0 | 0 | 1 | 0 | 1 | 0 | 0 | 0 | 0 | 0 |
| 6 | 0 | 0 | 1 | 0 | 0 | 1 | 0 | 0 | 0 | 1 | 0 | 0 | 0 | 0 |
| 7 | 0 | 0 | 0 | 0 | 1 | 0 | 0 | 0 | 1 | 0 | 0 | 0 | 0 | 1 |
| 8 | 0 | 0 | 1 | 0 | 0 | 1 | 0 | 0 | 0 | 0 | 1 | 0 | 0 | 0 |
| 9 | 0 | 0 | 1 | 0 | 1 | 1 | 0 | 0 | 0 | 0 | 0 | 1 | 0 | 0 |
| S1 | 0 | 0 | 0 | 0 | 0 | 1 | 0 | 1 | 0 | 0 | 0 | 1 | 0 | 1 |
| S2 | 0 | 0 | 1 | 0 | 0 | 1 | 0 | 0 | 0 | 0 | 0 | 0 | 1 | 0 |
| S3 | 0 | 0 | 0 | 0 | 0 | 0 | 1 | 1 | 0 | 0 | 0 | 1 | 0 | 1 |
| S4 | 0 | 0 | 1 | 0 | 0 | 1 | 0 | 0 | 0 | 0 | 0 | 0 | 0 | 1 |

With reference now to the embodiment represented in FIGS. 2A to 2F, it is seen that the fourteen operator blocks BR1 to BR14 and the fourteen generator elements MF1 to MF14 to which they are connected have been divided in two different assemblies EB1 and EB2, assembly EB1 comprising operator blocks BR1 to BR7 and their associated generator elements MF1 to MF7 and the assembly EB2 comprising the operator blocks BR8 to BR14 and their generator elements associated with them MF8 to MF14. In the following, one will designate under the name of operator-generator block for logic signals a group constituted of an operator block and generator element connected to this operator block, each of these operator-generator blocks thus constituted being shown in FIGS. 2A to 2F by a respective one of the references OG1 to OG14. Each of these operator-generator blocks OG1 to OG14 is associated with a respective one of the characters 0, 1, 2, 3, 7, S1, S3, 4, 5, 6, 8, 9, S2 and S4 cited above. With reference then to Table V, which gives the delivered binary values, in response to a reading of a character, by the different generator elements MF1 to MF17, that is, by the different operator-generator blocks OG1 to OG14, one sees that, if the character read is one of the characters 0, 1, 2, 3, 7, S1 and S3, a binary signal "1" will appear at the output of one only of the operator-generator blocks of the assembly EB1 and that a binary signal "1" appears at the output of at least two of the operator-generator blocks of the assembly EB2. In the same way, if the character read is one of the characters 4, 5, 6, 8, 9, S2 and S4, a binary signal "1" appears at the output of one only of the operator-generator blocks of the assembly EB2 and that a binary signal "1" appears at the output of at least two of the operator-generator blocks of the assembly EB1. This characteristic, which results from a suitable choice of the values given to the specific coefficients $k_1$ to $k_7$ mentioned above, results in great simplification in the number and in the structure of the circuits utilized for the recognition of the different characters. This recognition is moreover much facilitated by the mode of discrimination utilized for the differentiation of the various characters based on the logic values "0" and "1" furnished by the generator-operator blocks, that is to say, on the sign of the voltages delivered by the operator blocks BR1 to BR14 and not on the amplitude of these voltages. For this reason, even if, by reason of certain defects caused by mediocre printing or the presence of undesirable lines, the form of the wave generated by the reading S17 during the reading of a character is only slightly altered and if, consequently, the amplitudes of the elementary signals sampled by the delay line 20 differ substantially from those of the elementary sinals delivered in the absence of such defects, the sign of each of the voltages delivered by the operator blocks BR1 to BR14 will not undergo, in general, any change, so that the rejection level for the information extracted from the characters identified by the recognition apparatus of the present invention is extremely low, that is to say, practically less than 1/10,000.

The identification of the different characters read by the reading head 17 is carried out by a discrimination apparatus or circuit which, in the embodiment shown in FIGS. 2A to 2F, comprises, on the one hand, two groups of validation circuits CV1 and CV2 which will be described hereafter and which are associated each with a respective one of the two assemblies EB1 and EB2 of operator generator blocks, and on the other hand, fourteen identification elements for the characters which are divided into two assemblies RK1 and RK2 each associated with a respective one of the two groups CV1 and CV2 above. As is seen in FIGS. 2A to 2F, fourteen inverted circuits I1 to I14 are branched each to the output of a respective one of the generator elements MF1 to MF14 to furnish inverse binary signals from those delivered by these generator elements. The group of validation circuits CV1 comprises, as is shown in FIGS. 2A to 2F, seven "AND" logic circuits E1 to E7 each of which comprise seven inputs of which one is connected to the output of a respective one of the generator elements MF1 to MF7 and of which the six others are connected each to the output of a respective one of the six inverter circuits which are branched to the output of the six other generator elements of the assembly EB1. Thus, for example, one of the inputs of "AND" circuit E1 is connected to the output of the generator elements MF1, while the six others of this "AND" circuit are connected each to the outputs of a respective one of the inverter circuits I2 to I7. Likewise, one of the inputs of the "AND" circuit E2 is connected to the output of generator element MF2, While the six other inputs of this circuit E2 are connected each to the output of a respective one of the inverter circuits I1 and I3 to I7 and so on. Each of the "AND" circuits E1 to E7 is provided with an output which is connected to the respective one of seven inputs of an "OR" circuit U1 having nine inputs. The group of validation circuits CVI comprises again an "OR" circuit UG1 comprising, on the one part, seven inputs each connected to the output of a respective one of the generator elements MF1 to MF7, on the other part, an output which is connected, through an inverter circuit IF1, to an input of circuit U1, other than those which are already connected to the outputs of the "AND" circuits E1 to E7. The last input of this circuit U1 is connected to the output of an inverter circuit IF2 to be discussed hereinafter.

The group of validation circuits CV2, which is of analogous structure to that of the group of validation circuit CVI, comprises, as is seen in the embodiment of FIGS. 2A to 2F, seven logic "AND" circuits E8 to E14 which each of which comprise seven inputs of which one is connected to the output of a respective one of the generator elements MF8 to MF14 and of which the six others are connected each to the output of a respective one of six inverter circuits which are branched to the outputs of the six other generator element of assembly EB2. Each of these "AND" circuits E8 to E14 is provided with an output which is connected to a respective one of seven inputs of an "OR" CIRCUIT U2 having nine inputs. The group of validation circuits CV2 comprise again an "OR" circuit UG2 comprising, one one part, seven inputs connected each to the output of a respective one of the generator elements MF8 to MF14 and, on the other part, an output which is connected, through an inverter circuit IF2, to an input of circuit U2, other than those which are already connected to the outputs of the "AND" circuits E8 to E14. The last input of circuit U2 is connected to the output of inverter circuit IF1 to be discussed hereinafter.

In view of the structure of the groups of validation circuit CV1 and CV2 which will be described, it is easy to see that, in the case when the binary signal "1" appears at the output of one of the generator elements MF1 to MF7, a binary signal "1", represented by a positive voltage, appears at the output of one only of the "AND" circuits E1 to E7. Thus, for example, if a binary signal "1" appears only at the output of element MF4 and if, consequently, the six inverter circuits I1, I2, I3, I5, I6 and I7 deliver a binary signal "1" while inverter circuit I4 delivers a binary signal "0", then, of all the "AND" circuits E1 to E7, only circuit E4, all of the inputs of which receive a binary signal "1", delivers at its output a binary signal "1". Under these conditions, a positive voltage representing a binary signal "1" appears at the output of "OR" circuit U1, this output constituting the output of the group of circuits CV1. On the contrary, in the case when, in accordance with the conditions which will be discussed further, a binary signal "1" appears simultaneously at the output of at least two of the generator elements MF1 to MF7, no positive voltage appears at the output of any of the "AND" circuits E1 to E7 or at the output of inverter circuit IF1. If, further, no positive voltage appears at the output of inverter circuit IF2, then no positive voltage appears at the output of "OR" circuit U1 and this absence of positive voltage will represent conventionally the binary signal "0". Finally, in the case where a binary signal "0" appears simultaneously at the output of all of the generator elements MF1 to MF7, a binary signal "1" appears at the output of inverter circuit IF1, so that the output of circuit U1 and that of circuit U2 each delivers a binary signal "1".

Further, reasoning in the manner as above, it is understood that, in the case where a binary signal "1" appears at the output of one only of the generator elements MF8 to MF14, a binary signal "1" is delivered to the output of the "OR" circuit U2, the output of this "OR" circuit constituting the output of a group of circuits CV2. On the contrary, in the case where a binary signal "1" appears simultaneously at the output of at least two of the generator elements MF8 to MF14, circuit U2 delivers at its output a binary sinal "0". Finally, in the case where a binary signal "0" appears simultaneously at the output of all of the generator elements MF8 to MF14, a binary signal "1" appears at the output of the inverter circuit IF2, so that the output of circuit U2 and that of circuit U1 delivers a binary signal "1".

FIGS. 2A to 2F again show an "exclusive OR" circuit UE which is provided to deliver at its output a binary signal "1" only in the case where a binary signal "1" appears at the output of one only of the group of validation circuits CV1 to CV2. In the example described, this circuit UE is constituted, on one part, of two inverter circuits IV1 and IV2 connected each to the output of a respective one of the circuits U1 and U2, on the other part, of two "AND" circuits EX1 and EX2 of which circuit EX1 comprises two inputs connected respectively to the output of circuit U1 and to the output of inverter circuit IV2 and of which circuit EX2 comprises two inputs connected respectively to the output of circuit U2 and to the output of inverter circuit IV1, the outputs of the circuits EX1 and EX2 being connected to the inputs of an "OR" circuit UX having two inputs. The function of circuit UE being well known, it will be simply indicated that a binary signal "1" appears at its output, that is to say at the output of circuit UX, in the case where the groups of circuits CV1 and CV2 deliver respectively, at the same moment, the binary signals "1" and "0" or again in the case where these groups CV1 and CV2 deliver respectively, at the same moment, the binary signals "0" and "1".

The present apparatus for recognition of characters comprises, in addition to the groups of validation circuits CV1 and CV2 discussed above, fourteen identification circuits EK1 to EK14 each associated with a respective one of the generator elements MF1 to MF14. These fourteen elements EK1 to EK14 are divided into two different assemblies RK1 and RK2 each associated with a respective one of the groups CV1 and CV2, the assembly RK1 comprising the elements EK1 to EK7 and the assembly RK2 comprising the elements EK8 to EK14. It can be stated in referring to the embodiment of FIGS. 2A to 2F that each of these identification elements is constituted by an "AND" circuit with three inputs of which the first is connected to the output of the generator element associated with this identification element, of which the second is connected to the output of the group of validation circuits which is associated with the assembly forming a part of this identification element, and of which the third is connected to the output of circuit UE discussed above. Thus, for example, the three inputs of "AND" circuit EK4 are connected respectively to the output of generator element MF4, to the output of circuit U1 and to the output of circuit UE. Likewise, the three inputs of "AND" circuit EK8 are connected respectively to the output of generator element MF8, to the output of circuit U2 and to the output of circuit UE. It is understood then that, in the case where a binary signal "1" appears at the output of one only of the generator elements of the assembly EB1 and where a binary signal "1" appears at the output of two at least of the generator elements of the assembly EB2, a binary signal "1" appears at the output of circuit U1 and a binary signal "0" apperas at the output of circuit U2, whereby a binary signal "1" is delivered at the output of the circuit UE. It then results that, among the "AND" circuits EK1 to EK7, only that of which the first input is connected to the output of the generator element of the ED1 assembly on which appears a binary signal "1", receives a binary signal "1" on the three inputs. From this fact, a binary signal "1" appears at the output of the "AND" circuit. It is understood, further, that in the case where a binary signal "1" appears at the output of one only of the generator elements of the assembly EB2 and where a binary signal "1" appears at the output of at least two of the generator elements of the assembly EB1, a binary signal "1" is delivered by that one of the "AND" circuits EK8 to EK14 which at its first input is connected to the output of the generator element of the EB2 assembly on which appears a binary signal "1". With reference now to Table V given above, it is seen that in the case where the character which is read by the reading head 17 is the character "0", a single one of the generator elements of the EB1 assembly delivers a binary signal "1" (signal $g_1$) this generator element being here element MF1, while three of the generator elements of the EB2 assembly deliver a binary signal "1" (signals $g_8$, $g_{12}$ and $g_{14}$), these three generator elements being the elements MF8, MF12, and M14. In view of the explanations which have been given above, it is understood then that, in the case where the character read is the character "0", a binary signal "1" appears at the output of EK1 circuit, while the EK2 to EK14 circuits deliver at their outputs a signal "0". In the same way, in the case where the character read is the character "1", a binary signal "1" appears solely at the output of the EK2 circuit. Thus, each of the circuit EK1, EK2, EK14 is associated with the respective one of the characters 0, 1, 2, 3, 7, S1, S3, 4, 5, 6, 8, 9, S2 and S4, and delivers a binary signal "1" only when the character which is read by the reading head is that with which it is associated. This binary signal "1" thus constitutes a recognition signal for identification of the character which has been read. Thus, for example, if the signal "1" appears at the output of the EK10 circuit, the character which has been read by the reading head is the character "6". The identification of the characters which is thus realized has merit only if the elementary signals which are utilized by the recognition apparatus to carry out this identification are those which are delivered on the precise medians of the delay line 20 when the voltage wave resulting from the reading of a character is completely contained in the delay line. This is why the identification which is carried out by this apparatus is valid only at a determined instant by means of an electric impulse produced in the following manner.

If reference is made to the embodiment of FIGS. 2A to 2F, it is seen that to the median contact M1 of delay line 20, is connected a derivation amplifier AD which, being of known construction is utilized to deliver an electric impulse at its output each time that its input is carried to a positive potential. The output of this AD derivation amplifier is connected, on one hand, to the normal input of a bridge BIK, and, on the other, to the conditioned input of a control gate CK. Gate CK, which is of known structure, is analogous to that which has been described and shown primarily in French Patent Nos. 1.342.787 and 1.387.085 and it comprises two inputs of which one, marked with a dot on the drawing, is a conditioned input to which are applied the electric impulses to be transmitted, and of which the other is a conditioned input to which an electric voltage is applied. It will be recalled that such a control gate transmits an impulse applied to its conditioned input only if its conditioned input is at a positive potential. The bridge BIK is, likewise, analogous to those which have been incidentally described in the preceding patents and it comprises a "normal" input and a "complementary" input. It will be recalled that this bridge passes or stops at the state "1" each time that it receives an impulse by its "normal" input and at the state "0" each time that it receives an impulse on its "complementary" input. The "complementary" output of this bridge BIK being connected to the conditioned input of control gate CK, it should be considered that this bridge BIK is initially in the "0" state, so that the positive voltage which appears then at its "complementary" output is applied to the input of the conditioned input of gate CK and allows this gate to transmit all impulse applied to its conditioned input. If, now, during the course of propogation, in delay line 20, of the voltage wave consecutively engendered at the reading of a character, the elementary signal corresponding to the exploration of the portion of character contained in the band No. 1 arrives at the median contact M1 and this elementary signal is applied, not only to the input of the corrector amplifier AC1, but also to the input of the derivation amplifier AD which unlocks the sending of an impulse by it. This impulse is then applied to control gate CK, on one hand, to the input of a delay element R1, on the other hand, to the input of a delay element R2. It is further applied to the normal input of bridge BIK which passes then to state "1" and thus makes gate CK nonconducting. However, the change of state of bridge BIK occurs only when the impulse which has been applied to the conditioned input of the control gate CK has already been transmitted to delay elements R1 and R2. The delayed impulse which then appears at the output of delay element R2 is supplied to the conditioned inputs of fifteen control gates C1 to C14 and CR, each of the gates C1 to C14 being connected by its conditioned input to a respective one of the outputs of the "AND" circuits EK1 to EK14, and the gate CR having its conditioned input connected, through an inverter circuit IR, to the output of the "OR" circuit UX. The delay of the delay element R2 is so established that, in response to the impulse which is applied to its input, it delivers an impulse at its output at the end of a time equal to that which is necessary to carry out the treatment of the elementary signals delivered to the median contacts of delay line 20 when the voltage wave resulting from the reading of a character is completely contained in this line, the binary signals appearing, at the end of this time, on the outputs of the "AND" circuits EK1 to EK14 being then those issued from the treatment of these elementary signals. It being understood that, as explained above, at the end of this treatment, a binary signal "1", represented by a positive voltage, appears at the output of one only of the "AND" circuits EKI to EK15, makes that control gate conducting which is connected to the output of this "AND" circuit. The delayed impulse which, coming from delay element R2, is applied to the conditioned inputs of gates C1 to C14 and is transmitted only by the single conducting gate. The impulse thus transmitted is applied to a corresponding one of fourteen utilization members for the recognition signals D1 to D14 each connected to the output of a respective one of the control gates C1 to C14. It will be assumed, in the described example, that each of these fourteen members D1 to D14 is constituted by a code arrangement which, each time that an impulse is applied to its input, delivers a combination of binary signals representative of the character with which this arrangement is associated, each of the members D1, D2, ..., D14 being associated to this end with a respective one of the characters 0, 1, 2, 3, 7, S1, S3, 4, 5, 6, 8, 9, S2 and S4.

In the case where, because of particularly large inking defects or an excessive abundance of undesirable marks, no binary signal "1" appears consecutively at the reading of a character, either at the output of circuit U1 or at the output of circuit U2, the circuit UE will then not deliver at its output a binary signal "1". Under these conditions, none of the circuits EK1 to EK14 furnish at its output a binary signal "1" and, consequently, none of the gates C1 to C14 are conducting. In this case, however, a binary signal "1" represented by a positive voltage appears at the output of inverter circuit IR and thus makes gate CR conducting. The delayed impulse delivered by element R2 and applied on the conditioned inputs of gate CR and C1 to C14, will then transmit only by gate CR and, constituting a rejection signal, will be applied to an apparatus utilizing the reject signal DR, this apparatus being, for example, either visual signalling that the reading which has just occurred should be rejected or apparatus controlling the delivery of the document which has just been read to a rejection box.

Further, in the case where all of the outputs of the generator elements MF1 to MF7 simultaneously deliver a binary signal "0", or again in the case where all of the outputs of the generator elements MF8 to MF14 simultaneously deliver a binary signal "0", the circuits U1 and U2 simultaneously furnish at their output a binary signal "1", whereby the circuit UE delivers at its output a binary signal "0". Under these conditions, a reject signal, derived from a transmission by gate CR of the impulse delivered by delay element R2, would be also applied to apparatus utilizing the reject signal DR.

Thus as can be seen in FIG. 2A, the return to state "0" of bridge BIK is obtained by applying on the complementary input of this bridge the delayed impulse which is delivered by delay element R1. It is necessary to note to this end that the delay of element R1 is established in such a way, in response to the impulse only at the moment when, during the progression in delay line 20 of the voltage wave resulting from the reading of a character, the elementary signal corresponding to the exploration of the portion of the character contained in the band 7 has finished appearing at the median contact M1 of line 20, that is, when this voltage wave has entirely disappeared from delay line 20. The return to state "0" of bridge BIK results in making control gate CK again conducting so that this gate is again capable of transmitting the impulse ultimately sent by derivation amplifier AD at the end of the progression, in the delay line 20, of the voltage wave resulting from the reading of another character.

Figure 5:
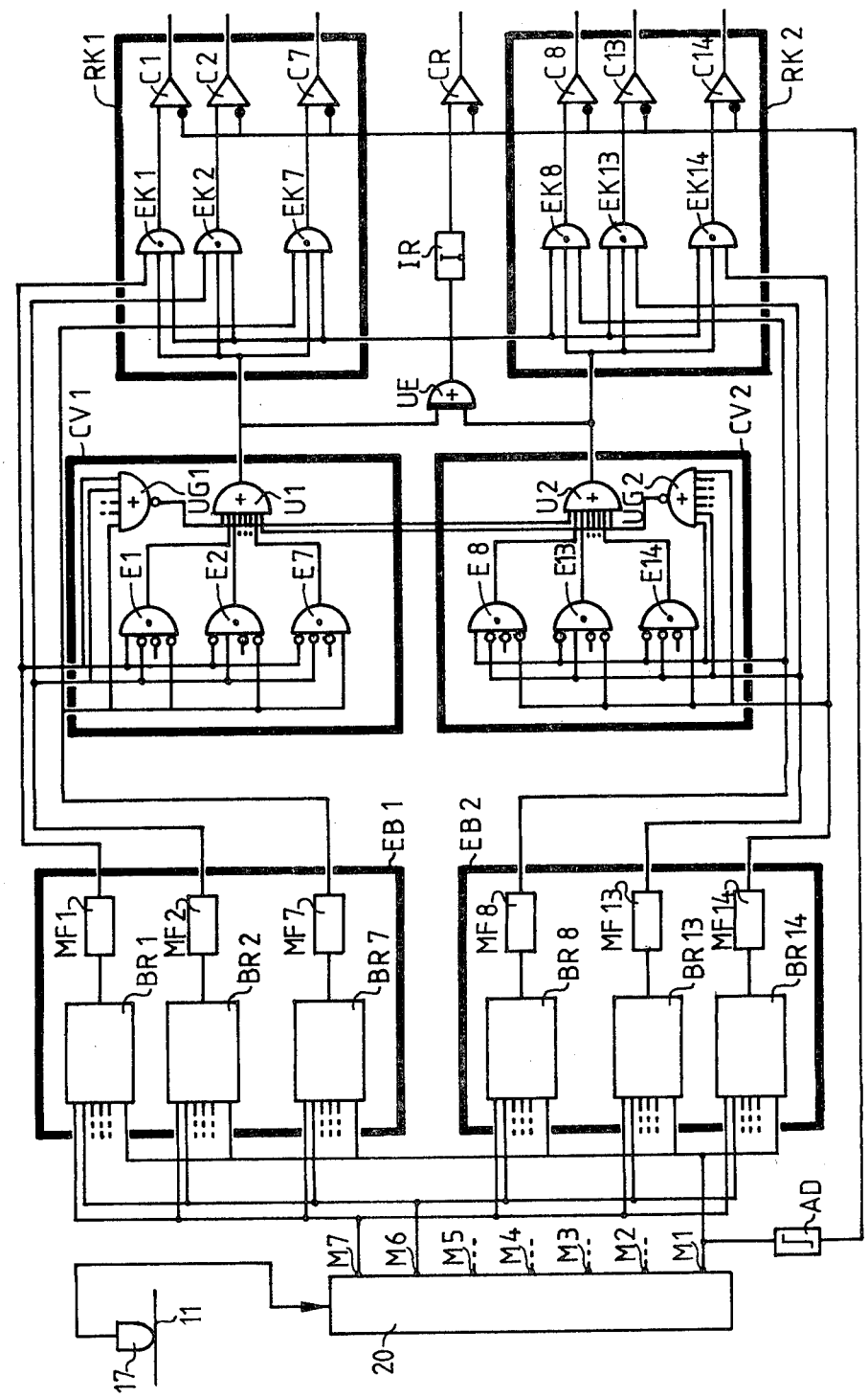
FIG. 5 is a simplified logic diagram of the invention which includes the principal elements shown in the arrangement detailed in assembled FIGS. 2A to 2F.

To carry out the recognition of characters of a group comprising a number K of characters where $K>N$, N being the number of bands chosen for the division of a large character, the character recognition apparatus which has been described and which has been shown in simplified manner in FIG. 5 also comprises, in a general way, K operator-generator blocks of logic signals. Each of these operator-generator blocks (such as those formed by the association of operator block BR1 and of the generator element MD1, for example) comprises, on one hand, N multiplier elements (such as the elements EM1 to EM7, for example) each for multiplying a respective one of the N elementary signals by a coefficient specific to this multiplier element, and a summing element (such as ES) connected to the output of these multiplier elements to deliver a single signal of which the amplitude is equal to the algebraic sum of the amplitudes of the N elementary signals thus multiplied, on the other hand, a generator element of logic signal (such as MF1, for example) connected to this summing element to receive this single signal and to deliver to its output one or the other of two logic signals "1" or "0" in accordance with whether the amplitude of this signal is positive or not. In such character recognition apparatus, these K operator-generator blocks of logic signals are divided into p different assemblies, p being a whole number such that:

$$\frac{K}{N} \leq P < \frac{K+N}{N}$$

Therefore, in the example described above, where $K=14$ and $N-7$, the 14 operator-generator blocks are divided in two ($p=2$) different assemblies (EB1 and EB2) and it follows:

$$\frac{14}{7} \leq 2 < \frac{21}{7}$$

Further, in the case where it is necessary to recognize characters in a range comprising 48 characters ($K=48$) and assuming $N=8$, the 48 operatoar-generator blocks would be divided into six different assemblies, which would then give:

$$\frac{48}{8} \leq 6 < \frac{56}{8}$$

The recognition apparatus in its generator form comprises further p validation means (such as the two validation means CV1 and CV2, for example) each associated with a respective one of the p operatoar-generator block assemblies and each, in response to the exploration of a character, delivering a single validation signal in the case where one only of the operator-generator blocks of the associated assembly delivers a logic signal "1". Such a recognition apparatus comprises, further, K character identification elements (such as EK1 to EK14, for example) which are each connected to the output of a respective one of the K operator-generator blocks. These K identification elements are divided in p different assemblies (such as the two assemblies RK1 and RK2, for example) each associated with a respective one of the p validation means. Each of these identification elements is connected further to the output of the validation means which is associated with it. Thus, for example, the identification element EK4 is connected, not only to the output of operator-generator block OG4, but also to the output of validation means CV1. Each of these identification elements generates a recognition signal of the character only when it receives at the same time, on one hand, a validation signal generated by the validation means to which it is connected and, on the other hand, a logic signal "1" generated by the operator-generator block to which it is connected.

It is necessary to again note that the number K of characters making up the group that the recognition apparatus can identify is not absolutely an entire multiple of number N of bands chosen for the division of a large character and that, in the most general embodiment of such apparatus the p assemblies of operator-generator blocks are constituted, on one hand, of (p−1) assemblies each comprising N operator-generator blocks and, on the other hand, a $p^{th}$ assembly comprising (K+N−pN) operator-generator blocks. In this general case, the p means of validation are themselves formed:

of (p−1) first validation means each having a structure analogous to that of the validation means CV1 and then each comprising N "AND" circuits and a first "OR" circuit (such as U1) connected in a manner similar to that of means CV1; and a $p^{th}$ means of validation comprising, on the one hand, (K+N−pN) "AND" circuits each associated with a respective one of the operator-generator blocks of the $p^{th}$ assembly and each having (K+N−pN) inputs of which one is connected to the output of the associated operator-generator block and of which the others are each connected, through an inverter circuit, to a respective one of the outputs of the other operator-generator blocks of the $p^{th}$ assembly and, on the other hand, an "OR" circuit having (K+N−pN) inputs each connected to a respective one of the outputs of the (K+N−pN) "AND" circuits.

Each of the p validation means comprises further a second "OR" circuit (such as UG1) which, when it is included in one of the (p−1) first validation means, comprises N inputs each connected to a respective one of the outputs of the operator-generator blocks (such as OG1 to OG7) of the associated assembly, and which, when it is inlcuded in the $p^{th}$ validation means, comprises (K+N−pN) inputs each connected to a respective one of the outputs of the operator-generator blocks of the $p^{th}$ assembly. Each of the first "OR" circuits (such as U1) of the p validation means comprise, in addition to the inputs which are connected to the output of the "AND" circuits of the validation means to which this first "OR" circuit relates, p supplementary inputs which are connected each, through an inverter circuit (IF1 or IF2, for example) to a respective one of the outputs of the second "OR" circuits (UG1 and UG2, for example).

In the most general embodiment of the recognition apparatus in accordance with the invention, the single "OR" circuit comprises p inputs connected each to a respective one, of the outputs of the p validation means and that this "OR" circuit set up is in known manner, to deliver at its output a single binary signal "1" in the case where only one of the p validation means generates a validation signal.

It should be understood that the invention is not limited to the embodiments as described and illustrated which have been given only by way of example. On the contrary, it comprises all means constituting equivalent techniques to those described and illustrated considered separately or in combination and utilized in the body and within the scope of the claims which follow.

What is claimed is:

1. Character recognition apparatus for the recognition of stylized characters on a document, wherein the characters to be recognized are a part of a group comprising K different characters, a reading station (17, 18, 20) for reading the characters, driving means (13, 14) to cause a relative displacement between the document and said station, in a direction of displacement permitting each character to pass before said reading station, said station including reading means disposed such that each time a character passes before it, the character is read, and a group of N elementary analogic signals is generated, each resulting from the reading of a respective one of N portions of a character obtained by dividing each character to be read along a direction perpendicular to the direction of displacement;

K operator-generator blocks of logic signals (OG1, OG2, OG3 etc.) to be associated with a respective one of the K characters to be read each of these blocks comprising, on the one hand, N multiplier elements (EM1, EM2, EM3, etc.), each connected to the reading station to receive a respective one of the N elementary analogic signals of a group generated by this station and to multiply this elementary signal by a specific coefficient of said multiplier element;

and a summing element (ES) connected to the N multiplier elements to receive the N elementary signals thus multiplied and delivering at its output a single signal having an amplitude equal to the algebraic sum of the amplitudes of the N multiplied signals, and a generator element for generating a logic circuit connected to said summing element (ES) to receive said single signal, said generator element generating at its output one or the other of two logic signals "1" or "0" in accordance with whether the amplitude of said single signal is positive or not, respectively, the operator-generator blocks being divided in p different assemblies (EB1, EB2), p being a whole number such that:

$$\frac{K}{N} \leq p < \frac{K+N}{N}$$

the specific coefficients of said multiplier elements having a value chosen such that, in response to the reading of a character, the operator-generator block which is associated with this character delivers a logic signal "1", the other operator-generator blocks which appertain to the same assembly as this operator-generator block each delivers a logic signal "0" while, in each of the other assemblies at least two operator-generator blocks each deliver a logic signal "1";

p validation means (CV1, CV2) each associated with a respective one of the p assemblies of operator-generator blocks (EB1, EB2) and each generating in response to the reading of a character, a single validation signal in the case where one only of the operator-generator blocks of the associated assembly delivers a logic signal "1"; and K character identification elements (EK1, EK2, EK3, etc.) each connected to the output of a respective one of the K operator-generator blocks (OG1, OG2, OG3, etc.), said K identification elements being divided in p different assemblies (RK1, RK2) each associated with a respective one of the p validation means (CV1, CV2), each of these identification elements being connected further to the output of the validation means which is associated with it, and generating a single character recognition signal when it receives at the same time, on the one hand, a validation signal generated by the said validation means, and, on the other hand, a logic signal "1" generated by the operator-generator block to which it is connected.

2. Apparatus for the recognition of characters in accordance with claim 1 further comprising a single "OR" circuit (UE) provided, on one hand, with p inputs connected each to a respective one of the outputs of the p validation means (CV1, CV2), and on the other hand, with an output to which are connected the K character identification elements (EK1, EK2, EK3, etc), the single "OR" circuit being operatively connected to deliver at its output a single binary signal "1" in the case where one only of the p validation means engenders a validation signal, each of the K identification elements further generating a character recognition signal in response to the simultaneous reception of a validation signal and of a logic signal "1" only if it also receives a binary signal "1" from the single "OR" circuit.

3. Apparatus for the recognition of characters in accordance with claim 2, further comprising indicator rejection means (IR) connected to the output of the single "OR" circuit (UE) to deliver at its output a signal indicating rejection of the character read by the reading station, in the case where the single "OR" circuit does not deliver the binary signal "1".

4. Apparatus for the recognition of characters in accordance with claim 2, wherein each identification element is constituted by an "AND" circuit with three inputs of which the first is connected to the output of the operator-generator block which is associated with this element of which the second is connected to the output of the validation means associated with said element and of which the third is connected to the output of the single "OR" circuit (UE).

5. Apparatus for the recognition of characters in accordance with claims 1, 2, 3 or 4 wherein the p assemblies of operator-generator blocks are formed of (p−1) assemblies each comprising N operator-generator blocks and of a $p^{th}$ assembly comprising (K+N−pN) operator-generator blocks, the p validation means include:

(p−1) first validation means each associated with a respective one of (p−1) said assemblies of operatoar-generator blocks and each comprising, on the one hand, N "AND" circuits (E1, E2, E3, etc.) each associated with a respective one of the operator-generator blocks (OG1, OG2, OG3, etc.) of the associated assembly and each having N inputs of which one is connected to the output of the operator-generator block associated with it and of which the others are each connected through an inverter circuit (I1, I2, I3, etc.) to a respective one of the outputs of the other operator-generator blocks of the associated assembly, on the other hand, an "OR" circuit (U1) having N inputs each connected to a respective one of the outputs of the N "AND" circuits; and a $p^{th}$ means of validation comprising, on the one hand, (K+N−pN) "AND" circuits each associated with a respective one of the operator-generator blocks of the $p^{th}$ assembly and each possessing (K+N−pN) inputs of which one is connected to the output of the associated operator-generator block and of which the others are each connected, through an inverter circuit, with a respective one of the outputs of the other operator-generator blocks of the $p^{th}$ assembly, and on the other hand, an "OR" circuit having (K+N−pN) inputs connected each to a respective one of said outputs (K+N−pN) of the "AND" circuits.

6. Apparatus for the recognition of characters in accordance with claim 5, wherein each of the p and $p^{th}$ validation means further comprise a second "OR" circuit (UGI) which in one of the (p−1) first validation means comprises N inputs each connected to a respective one of the outputs of the operator-generator blocks (OG1 to OG7) of the associated assembly, and in the $p^{th}$ validation means comprises (K+N−pN) inputs connected each to a respective one of the outputs of the operator blocks of the $p^{th}$ assembly, each of the first "OR" circuits of the p validation means further comprising p supplementary inputs each connected, through an inverter circuit, to a respective one of the outputs of the said p second "OR" circuits.

7. Apparatus for recognition of characters in accordance with any of the claims 1, 2, 3 or 4 wherein each generator block is an operational amplifier (AP), and the reading station (17, 18, 20) comprises N outputs (M1, M2, M3, etc.) each to deliver a respective one of the N elementary signals resulting from the reading of the character, each of the N outputs of this station being connected, through a respective one of N resistances (R1, R2, R3, etc.), either to the inverting input (−), or to the noninverting input (+) of said amplifier, whereby the sign of the signal delivered by said output will or will not be inverted, the values of the N resistances as well as the manner of connection of said outputs on the two inputs of this amplifier being such that, when the character read is that which is associated with said operator block, the amplitude of the signal delivered at the output of said amplifier is practically equal to +1 volt.

8. Apparatus for recognition of characters in accordance with claim 5 wherein each generator block is an operational amplifier (AP), and the reading station (17, 18, 20) comprises N outputs (M1, M2, M3, etc.) each to deliver a respective one of the N elementary signals resulting from the reading of the character, each of the N outputs of this station being connected, through a respective one of N resistances (R1, R2, R3, etc.), either to the inverting input (−), or to the noninverting input (+) of said amplifier, whereby the sign of the signal delivered by said output will or will not be inverted, the values of the N resistances as well as the manner of connection of said outputs on the two inputs of this amplifier being such that, when the character read is that which is associated with said operator block, the amplitude of the signal delivered at the output of said amplifier is practically equal to +1 volt.

9. Apparatus for recognition of characters in accordance with claim 6 wherein each generator block is an operational amplifier (AP), and the reading station (17, 18, 20) comprises N outputs (M1, M2, M3, etc.) each to deliver a respective one of the N elementary signals resulting from the reading of the character, each of the N outputs of this station being connected, through a respective one of N resistances (R1, R2, R3, etc.), either to the inverting input (−), or to the noninverting input (+) of said amplifier, whereby the sign of the signal delivered by said output will or will not be inverted, the values of the N resistances as well as the manner of connection of said outputs on the two inputs of this amplifier being such that, when the character read is that which is associated with said operator block, the amplitude of the signal delivered at the output of said amplifier is practically equal to +1 volt.

10. Apparatus for the recognition of characters in accordance with any one of claims 1, 2, 3 or 4 wherein the reading station (17, 18, 20) includes a reading head (17) of which the output is connected to the input of an analogic delay line (20) having N median contacts each delivering a respective one of N elementary analogic signals, and further comprising K control gates (C1, C2, C3 etc.) each connected to the output of a respective one of K character identification elements (EK1, EK2, EK3, etc.), and a supplementary validation means (AD, CK, BIK, R1, R2) connected between the control gates (C1, C2, C3 etc.) and the delay line (20) to deliver to said gates a control signal for releasing the transfer to the utilization members D1, D2, D3 etc.) of the recognition signal created by the K identification elements, said control signal being generated only when the N elementary analogic signals resulting from the reading of a character appear simultaneously on the N median contacts.

11. Apparatus for the recognition of characters in accordance with claim 5 wherein the reading station (17, 18, 20) includes a reading head (17) of which the output is connected to the input of an analogic delay line (20) having N median contacts each delivering a respective one of N elementary analogic signals, and further comprising K control gates (C1, C2, C3 etc.) each connected to the output of a respective one of K character identification elements (EK1, EK2, EK3, etc.), and a supplementary validation means (AD, CK, BIK, R1, R2) connected between the control gates (C1, C2, C3 etc.) and the delay line (20) to deliver to said gates a control signal for releasing the transfer to the utilization members (D1, D2, D3 etc.) of the recognition signal created by the K identification elements, said control signal being generated only when the N elementary analogic signals resulting from the reading of a character appear simultaneously on the N median contacts.

12. Apparatus for the recognition of characters in accordance with claim 6 wherein the reading station (17, 18, 20) includes a reading head (17) of which the output is connected to the input of an analogic delay line (20) having N median contacts each delivering a respective one of N elementary analogic signals, and further comprising K control gates (C1, C2, C3 etc.) each connected to the output of a respective one of K character identification elements (EK1, EK2, EK3, etc.), and a supplementary validation means (AD, CK, BIK, R1, R2) connected between the control gates (C1, C2, C3 etc.) and the delay line (20) to deliver to said gates a control signal for releasing the transfer to the utilization members (D1, D2, D3 etc.) of the recognition signal created by the K identification elements, said control signal being generated only when the N elementary analogic signals resulting from the reading of a character appear simultaneously on the N median contacts.

13. Apparatus for the recognition of characters in accordance with claim 7 wherein the reading station (17, 18, 20) includes a reading head (17) of which the output is connected to the input of an analogic delay line (20) having N median contacts each delivering a respective one of N elementary analogic signals, and further comprising K control gates (C1, C2, C3 etc.) each connected to the output of a respective one of K character identification elements (EK1, EK2, EK3, etc.), and a supplementary validation means (AD, CK, BIK, R1, R2) connected between the control gates (C1, C2, C3 etc. and the delay line (20) to deliver to said gates a control signal for releasing the transfer to the utilization members (D1, D2, D3 etc.) of the recognition signal created by the K identification elements, said control signal being generated only when the N elementary analogic signals resulting from the reading of a character appear simultaneously on the N median contacts.

* * * * *